(12) United States Patent
Galles et al.

(10) Patent No.: US 11,595,502 B2
(45) Date of Patent: Feb. 28, 2023

(54) METHODS AND SYSTEMS FOR LAYER 7 HARDWARE ASSIST AND CPU TASK OFFLOADS

(71) Applicant: Pensando Systems Inc., Milpitas, CA (US)

(72) Inventors: Michael Brian Galles, Los Altos, CA (US); Hemant Vinchure, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 91 days.

(21) Appl. No.: 17/071,975

(22) Filed: Oct. 15, 2020

(65) Prior Publication Data

US 2022/0124182 A1   Apr. 21, 2022

(51) Int. Cl.
  *H04L 29/06* (2006.01)
  *H04L 29/08* (2006.01)
  *H04L 69/22* (2022.01)
  *H04L 49/90* (2022.01)
  *H04L 67/02* (2022.01)

(52) U.S. Cl.
  CPC .............. *H04L 69/22* (2013.01); *H04L 49/90* (2013.01); *H04L 67/02* (2013.01)

(58) Field of Classification Search
  None
  See application file for complete search history.

(56) References Cited

U.S. PATENT DOCUMENTS

| | | | |
|---|---|---|---|
| 7,298,746 B1 | 11/2007 | De La Iglesia et al. | |
| 7,421,515 B2* | 9/2008 | Marovich | H04L 69/22 710/21 |
| 7,509,431 B2* | 3/2009 | Singhal | H04L 67/56 709/230 |
| 7,523,179 B1* | 4/2009 | Chu | H04L 69/22 713/1 |
| 7,602,731 B2* | 10/2009 | Jain | H04L 63/1408 713/168 |
| 7,626,940 B2* | 12/2009 | Jain | H04L 12/56 370/428 |
| 7,719,980 B2* | 5/2010 | Lee | H04L 69/22 370/401 |

(Continued)

OTHER PUBLICATIONS

Bishop, M., "Hypertext Transfer Protocol Version 3 (HTTP/3)", Sep. 25, 2020, 72 pgs.

(Continued)

*Primary Examiner* — Alpus Hsu
(74) *Attorney, Agent, or Firm* — Loza & Loza LLP

(57) ABSTRACT

Certain tasks related to processing layer 7 (L7) data streams, such as HTTP data streams, can be performed by an L7 assist circuit instead of by general-purpose CPUs. The L7 assist circuit can normalize URLs, Huffman decode, Huffman encode, and generate hashes of normalized URLs. A L7 data stream, which is reassembled from received network packets, includes an L7 header. L7 assist produces an augmented L7 header that is added to the L7 data stream. The CPUs can use the augmented L7 header, thereby speeding up processing. On the outbound path, L7 assist can remove the augmented L7 header and perform Huffman encoding such that the CPUs can perform other tasks.

20 Claims, 18 Drawing Sheets

(56) References Cited

U.S. PATENT DOCUMENTS

| | | | | |
|---|---|---|---|---|
| 8,611,350 | B2* | 12/2013 | Liu | H04L 12/4641 |
| | | | | 370/469 |
| 8,892,691 | B2* | 11/2014 | Pantos | H04L 65/60 |
| | | | | 709/219 |
| 8,909,813 | B2* | 12/2014 | Afek | H04L 63/1416 |
| | | | | 726/13 |
| 9,210,090 | B1* | 12/2015 | Baldi | H04L 47/31 |
| 9,471,646 | B2* | 10/2016 | Fablet | H04L 67/02 |
| 9,736,057 | B2* | 8/2017 | Chinni | H04L 47/34 |
| 10,178,156 | B2* | 1/2019 | Pradeep | H04L 67/10 |
| 2003/0187935 | A1* | 10/2003 | Agarwalla | H04L 9/40 |
| | | | | 709/213 |
| 2013/0297814 | A1* | 11/2013 | Annamalaisami | H04L 69/08 |
| | | | | 709/230 |
| 2014/0280813 | A1 | 9/2014 | Ramachandran et al. | |
| 2014/0289840 | A1* | 9/2014 | Jain | H04L 63/1425 |
| | | | | 726/13 |
| 2014/0355627 | A1* | 12/2014 | Bellessort | H03M 7/3088 |
| | | | | 370/477 |
| 2016/0191672 | A1* | 6/2016 | Perlman | H04L 69/163 |
| | | | | 370/474 |
| 2018/0198890 | A1* | 7/2018 | Dhanabalan | H04L 69/16 |
| 2018/0295134 | A1* | 10/2018 | Gupta | H04L 67/02 |
| 2019/0215306 | A1* | 7/2019 | Gopal | G06F 9/45558 |
| 2019/0215307 | A1* | 7/2019 | Gopal | H04L 63/0218 |
| 2019/0306145 | A1* | 10/2019 | Santelia | H04L 67/565 |
| 2020/0169536 | A1* | 5/2020 | Santelia | G06F 21/105 |

OTHER PUBLICATIONS

Iyengar, J. et al. "QUIC: A UDP-Based Multiplexed and Secure Transport", Sep. 10, 2020, 197 pgs.
P4, "P4 Language Tutorial", 2017, 55 pgs.
Peon, R. et al. "HPACK: Header Compression for HTTP/2", May 2015, 55 pgs.
Wikipedia, "URI Normalization", https://en.wikipedia.org/wiki/URI_normalization, retrieved Sep. 24, 2020, 5 pgs.
European Search Report for EP21201114, dated Jan. 17, 2022, 2 pgs.
Written Opinion for European Search Report, EP21201114, dated Jan. 17, 2022, 4 pgs.

* cited by examiner

| URL Normalization Examples | 2301 |
|---|---|
| Input | Output |
| http://example.com/foo%2a | http://example.com/foo%2A |
| HTTP://User@Example.COM/Foo | http://User@example.com/Foo |
| http://example.com/%7Efoo | http://example.com/~foo |
| http://example.com/sna/./fu/ya/../bar | http://example.com/sna/fu/bar |
| http://example.com | http://example.com/ |
| http://example.com:80/ | http://example.com/ |
| http://example.com/foo | http://example.com/foo/ |
| http://example.com/default.asp | http://example.com/ |
| http://example.com/a/index.html | http://example.com/a/ |
| http://example.com/bar.html#section1 | http://example.com/bar.html |
| http://208.77.188.166/ | http://example.com/ |
| https://example.com/ | http://example.com/ |
| http://www.example.com/ | http://example.com/ |
| http://example.com/display?lang=en&article=fred | http://example.com/display?article=fred&lang=en |

FIG. 23

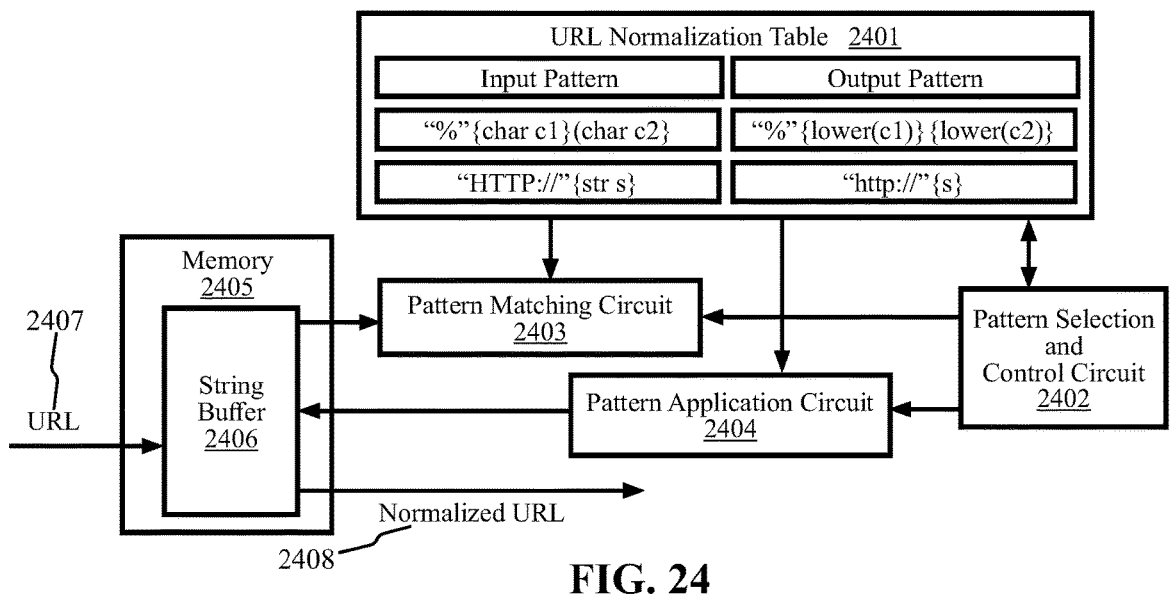

FIG. 24

METHODS AND SYSTEMS FOR LAYER 7 HARDWARE ASSIST AND CPU TASK OFFLOADS

TECHNICAL FIELD

The embodiments relate to computer networks, network appliances, network switches, network routers, P4 packet processing pipelines, programmable packet processing pipelines implemented using special purpose circuitry, processing layer 7 (L7) data streams, processing HTTP data streams, and processing L7 header data via special purpose circuits.

BACKGROUND

L7 data streams, such as HTTP data streams, are carried as network packets to servers for processing. L7 headers in the L7 data stream can be compressed via Huffman coding and can use different URLs (uniform resource locators) to specify the same location. Servers have general purpose processors that interpret the L7 header and the L7 data stream, process the L7 data stream, and respond to the sender.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include receiving a plurality of packets carrying a L7 data stream having a L7 header, each of the plurality of packets including a layer 2 header and a layer 3 header. The method can also include reassembling the L7 data stream from the plurality of packets to produce a reassembled L7 data stream, producing an enhanced L7 header from the L7 header, producing an enhanced L7 data stream that includes the L7 header and the enhanced L7 header, and queueing the enhanced L7 data stream for processing by a general-purpose processor.

Another aspect of the subject matter described in this disclosure can be implemented in a network appliance comprising a control plane including a general-purpose processor. The network appliance can also include a data plane configured to receive a plurality of packets carrying a L7 data stream having a L7 header, each of the plurality of packets including a layer 2 header and a layer 3 header. The data plane can additionally be configured to reassemble the L7 data stream to produce a reassembled L7 data stream, produce an enhanced L7 header from the L7 header, produce an enhanced L7 data stream that includes the L7 header and the enhanced L7 header, and queue the enhanced L7 data stream for processing by the general-purpose processor.

Yet another aspect of the subject matter described in this disclosure can be implemented by a system. The system can include a means for producing a means for indicating an enhanced L7 data stream from a means for indicating a L7 data stream, a means for queueing the enhanced L7 data stream for processing by a general-purpose processing means, a means for preparing the enhanced L7 data stream for transmission, and a means for transmitting a processed L7 data stream based on the enhanced L7 data stream.

In some implementations of the methods and devices, the reassembled L7 data stream is indicated by a fragment list having fragment indicators indicating memory locations of L7 data stream fragments, and wherein the enhanced L7 data stream is indicated by an enhanced fragment list having enhanced fragment indicators indicating memory locations of enhanced L7 data stream fragments.

In some implementations of the methods and devices, the enhanced fragment indicators include L7 assist indicators indicating whether the enhanced L7 data stream fragments are enhanced L7 header fragments. In some implementations of the methods and devices the reassembled L7 data stream is indicated by a fragment list having fragment indicators indicating memory locations of L7 data stream fragments, and the enhanced L7 data stream is produced by inserting an additional fragment indicator into the fragment list. In some implementations of the methods and devices, the method includes queueing the reassembled L7 data stream for processing by a L7 assist circuit, wherein the L7 assist circuit produces the enhanced L7 data stream.

In some implementations of the methods and devices, the L7 header includes Huffman coded elements, and producing the enhanced L7 header includes using a L7 assist circuit to decode the Huffman coded elements. In some implementations of the methods and devices, the enhanced L7 header includes a normalized header field produced by a L7 assist circuit from a header field in the L7 header. In some implementations of the methods and devices, the enhanced L7 header includes a normalized URL (uniform resource locator) produced by a L7 assist circuit from a URL in the L7 header. In some implementations of the methods and devices, the enhanced L7 header includes a hash computed from a normalized URL produced by a L7 assist circuit from a URL in the L7 header.

In some implementations of the methods and devices, the method also includes producing an outbound enhanced L7 data stream by processing the enhanced L7 data stream using the general-purpose processor, the outbound enhanced L7 data stream having an outbound enhanced L7 header. The method can additionally include producing an outbound L7 data stream by processing the outbound enhanced L7 data stream using an L7 assist circuit that removes the outbound enhanced L7 header, producing a plurality of outbound packets carrying the outbound L7 data stream, and transmitting the plurality of outbound packets.

In some implementations of the methods and devices, the reassembled L7 data stream is indicated by a fragment list having fragment indicators indicating memory locations of L7 data stream fragments, and a L7 assist circuit in the data plane is configured to produce an enhanced fragment list having enhanced fragment indicators indicating memory locations of enhanced L7 data stream fragments, the enhanced fragment list indicating the enhanced L7 data stream.

In some implementations of the methods and devices, an L7 assist circuit in the data plane is configured to produce the enhanced L7 data stream, receive an outgoing enhanced L7 data stream that includes an outbound enhanced L7 header, and produce an outbound L7 data stream by processing the outbound enhanced L7 data stream by removing the outbound enhanced L7 header. Furthermore, a packet processing pipeline circuit in the data plane can be configured to produce a plurality of outbound packets carrying the outbound L7 data stream, and the general-purpose processor can be configured to produce the outgoing enhanced L7 data stream from the enhanced L7 data stream, and the data plane is configured to transmit the plurality of outbound packets.

Some implementations of the methods and devices further comprise a hardware implemented processing means configured to decode Huffman coded elements, to Huffman code L7 header elements, and to produce a hash of a normalized URL.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 23 illustrates a non-limiting set of URL normalization examples according to some aspects.

FIG. 24 is a high-level conceptual diagram of a circuit that normalizes URLs according to some aspects.

Throughout the description, similar reference numbers may be used to identify similar elements.

DETAILED DESCRIPTION

Figure 1:
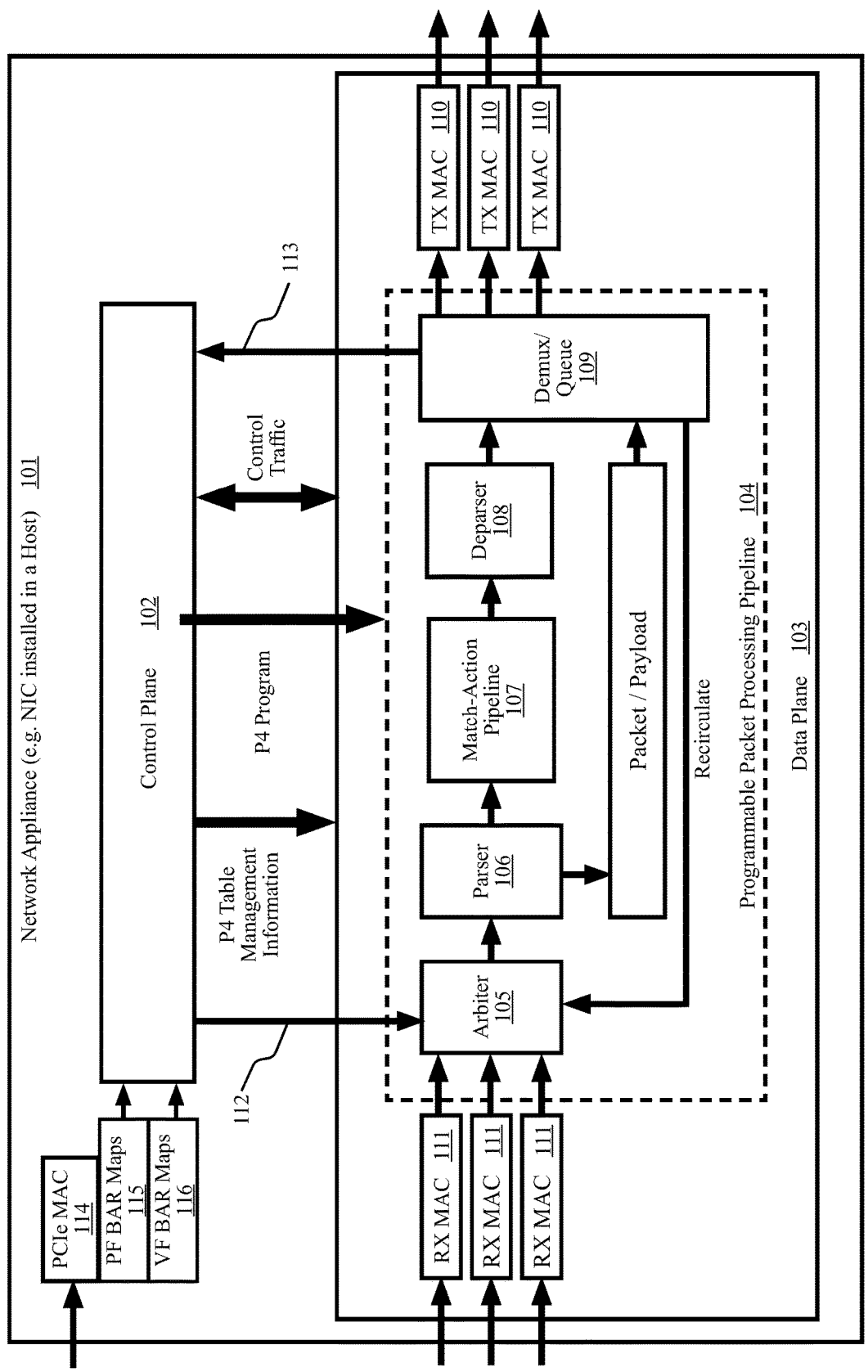
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Cloud native applications often use a microservice architecture in which a single application is an assembly of many independently deployed and loosely coupled components called microservices. The microservices are often deployed within containers or virtual machines (VMs) running on host machines. The microservices communicate with one another using well-defined APIs (application program interfaces), often using L7 (layer 7) protocols and L7 data streams such as HTTP (hypertext transfer protocol) data streams. As cloud native applications grow in size and complexity, microservice-to-microservice communications grow exponentially. With each microservice implementing its own network stack it is clear that substantial processing power is dedicated to handling network protocol layers.

A NIC installed in a host system and having L7 (layer 7) assist can perform much of the network protocol processing required of microservices running on the host. The data plane can receive network packets and perform L3 and L4 processing to thereby reassemble L7 data streams such as HTTP data streams. An HTTP header, however, may require certain processing such as Huffman decoding and URL (uniform resource locator) normalization. L7 assist in the data plane can perform that processing.

L7 assist performs processing that would otherwise be performed by general-purpose CPUs running the microservice. An advantage provided by L7 assist is that the microservice can run faster while consuming less power. L7 assist also frees the CPUs to process other aspects of the microservices. Another advantage is that the CPU implemented aspect of a microservice is simplified because the L7 assist preprocesses the L7 data stream during ingress and post processes the L7 data stream during egress.

FIG. 1 is a functional block diagram of a network appliance having a control plane and a data plane and in which aspects may be implemented. A network appliance 101, such as a NIC, can have a control plane 102 and a data plane. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include NVM Express (NVMe) controller management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "$P4_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MAC 111 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 110 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding.

As illustrated in FIG. 1, a P4 program is provided to the data plane via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, NVME-oF packets, iSCSI packets, etc.) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 305 for additional processing.

A NIC 101 can have a PCIe (peripheral component interconnect extended) interface such as PCIe MAC (media access control) 114. A PCIe MAC can have a BAR (base address register) at a base address in a host system's memory space. Processes, typically device drivers within the host systems operating system, can communicate with the NIC via a set of registers beginning with the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PCIe card. A VF BAR map 116 can be used by a VM running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. Some PCIe devices can have multiple PFs. For example, a NIC can provide network connectivity via one PF and can provide an NVMe controller via another PF. As such, the NIC can provide "NIC" VFs and "NVMe" VFs to VMs running on the host. The NVMe PF and VFs can be used to access remote non-volatile storage on SAN (storage area network) storage devices.

Figure 2:
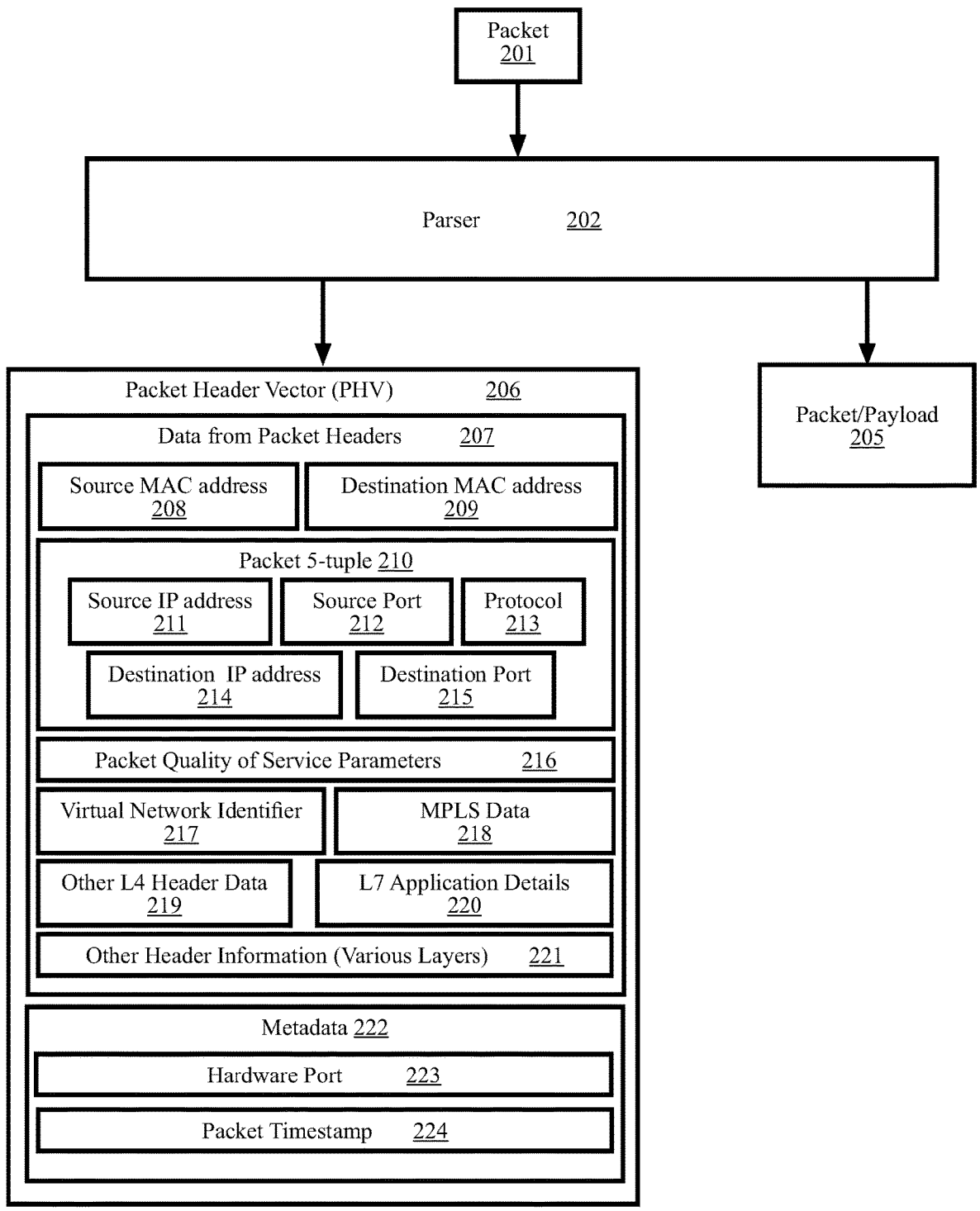
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The L7 application details 220 (e.g. hash of a normalized URL) can be obtained from the packet's layer 7 header or layer 7 payload. The other header information 221 is other information that can be contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Figure 3:
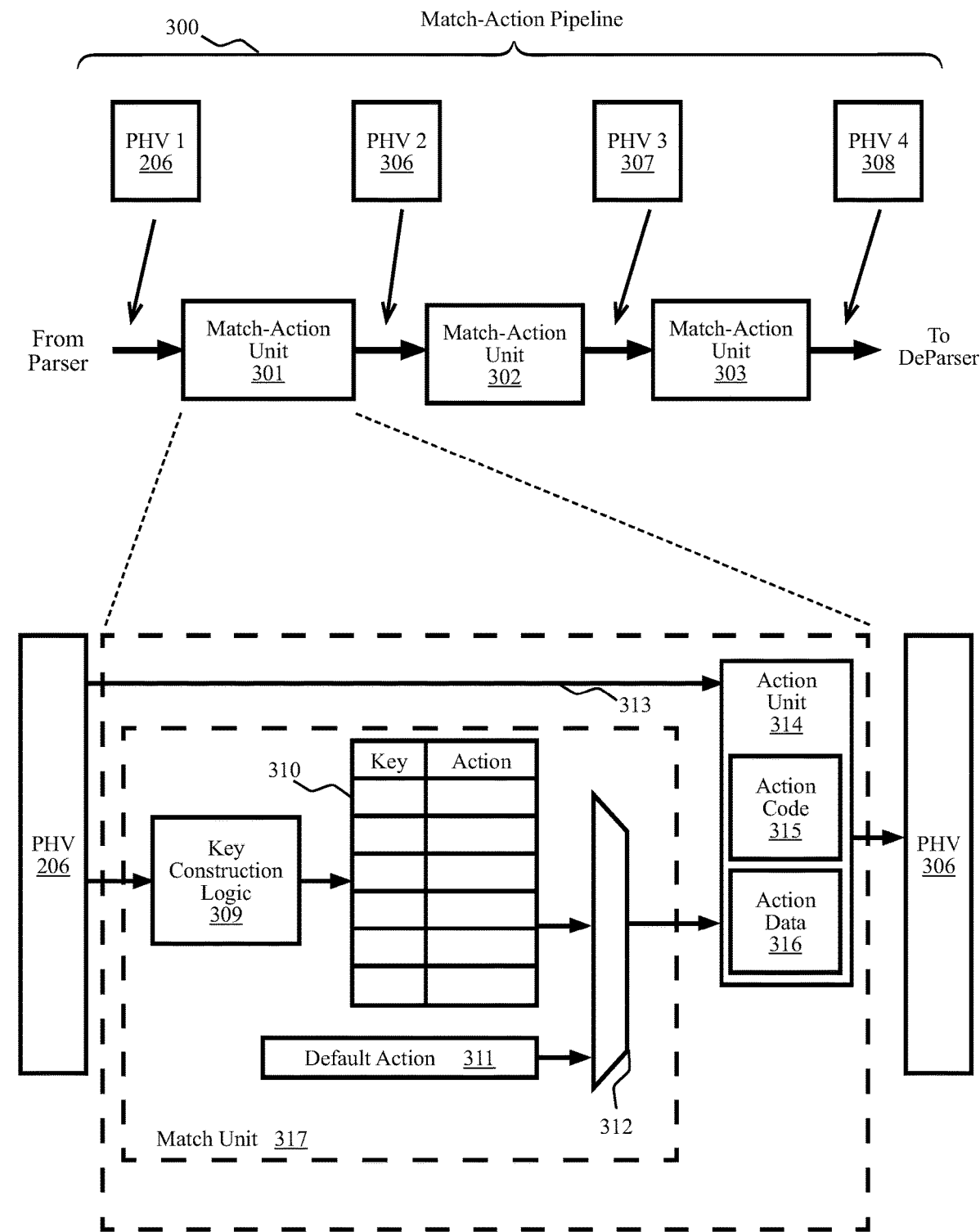
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 206 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 206 and an action unit 314 that produces an output PHV 306, which may be a modified version of the input PHV 206. The match unit 317 can include key construction logic 309, a lookup table 310, and selector logic 312. The key construction logic 309 is configured to generate a key from at least one field in the PHV. The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable in the control plane via P4 and the contents of the lookup table is managed by the control plane.

Figure 4:
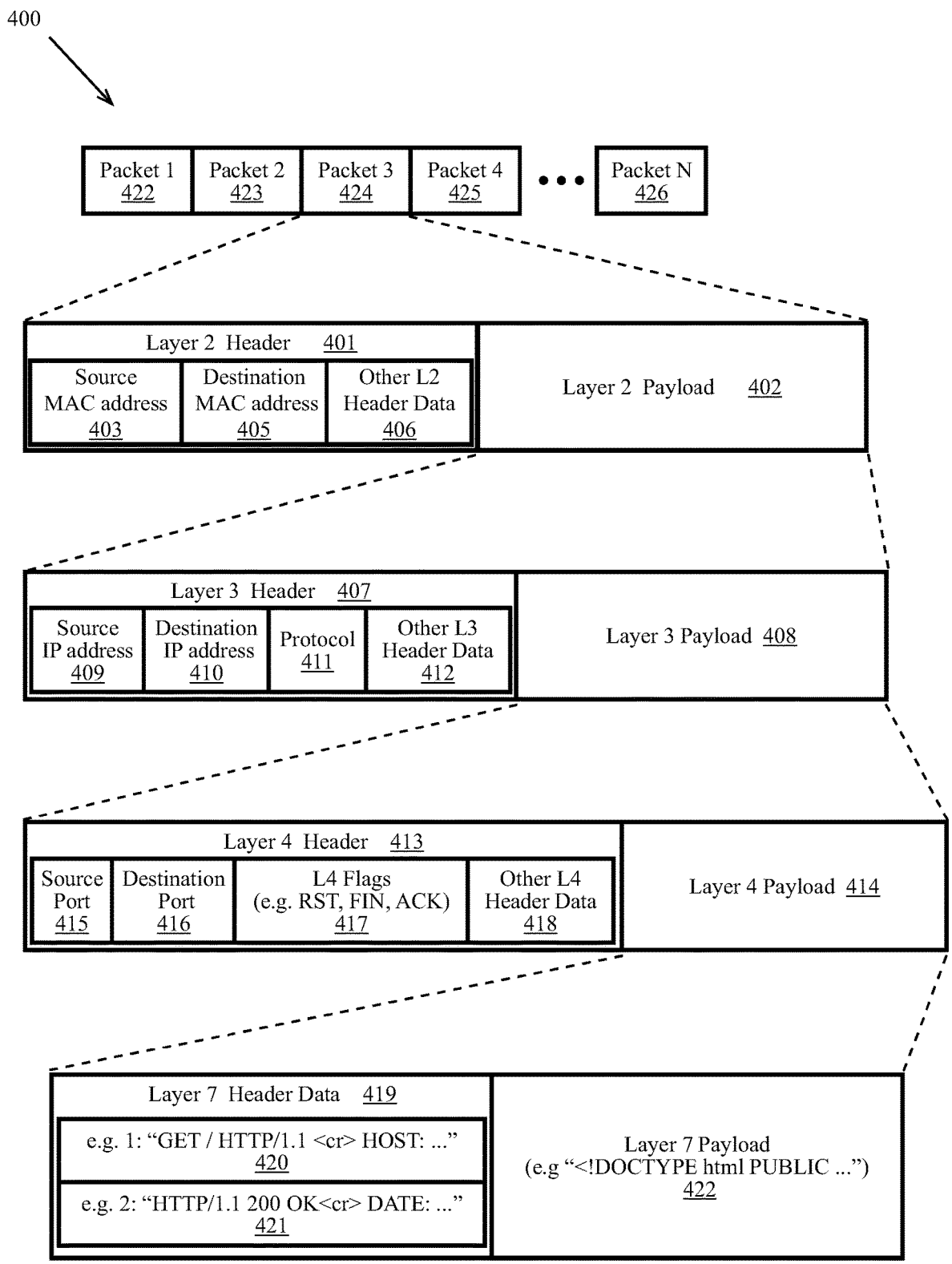
FIG. 4 illustrates network packet structures for layers 2, 3, 4, and 7 that may be processed according to some aspects.

FIG. 4 illustrates network packet structures for layers 2, 3, 4, and 7 that may be processed according to some aspects. A network traffic flow 400 can have numerous packets such as a first packet 422, a second packet 423, a third packet 424, a fourth packet 425, and a final packet 426 with many more packets between the fourth packet 425 and the final packet 426. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 401 and layer 2 payload 402. The layer 2 header can contain a source MAC address 403, a destination MAC address 405, and other layer 2 header data 406. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 402 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 407 and a layer 3 payload 408. The layer 3 header 407 can have a source IP address 409, a destination IP address 410, a protocol indicator 411, and other layer 3 header data 412. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 403 indicating the first node, a destination MAC address 405 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 403 indicating the intermediate node, a destination MAC address 405 indicating the second node, and the IP packet as a payload. The layer 3 payload 408 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 407 using protocol indicator 411. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 408 includes a TCP header and a TCP payload. UDP can provide for computer applications to send messages, in this case referred to as datagrams, to other hosts on an IP network using a connectionless model. When carrying UDP data, a layer 3 payload 408 includes a UDP header and a UDP payload. ICMP is used by network devices, including routers, to send error messages and operational information indicating success or failure when communicating with another IP address. ICMP uses a connectionless model.

A layer 4 packet can have a layer 4 header 413 and a layer 4 payload 414. The layer 4 header 413 can include a source port 415, destination port 416, layer 4 flags 417, and other layer 4 header data 418. The source port and the destination port can be integer values used by host computers to deliver packets to application programs configured to listen to and send on those ports. The layer 4 flags 417 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 414 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), the Dynamic Host Configuration Protocol (DHCP), and the NVMe/TCP protocol. Data coded according to application layer protocols can be encapsulated into transport layer protocol units (such as TCP or UDP messages), which in turn use lower layer protocols to effect actual data transfer.

A layer 7 (L7) packet can include L7 header data 419 and a L7 payload 422. The L7 header data 419 can be an HTTP header such as a HTTP "GET" request 420 or HTTP acknowledgement 421. The L7 payload 422 can be an HTTP payload.

Figure 5:
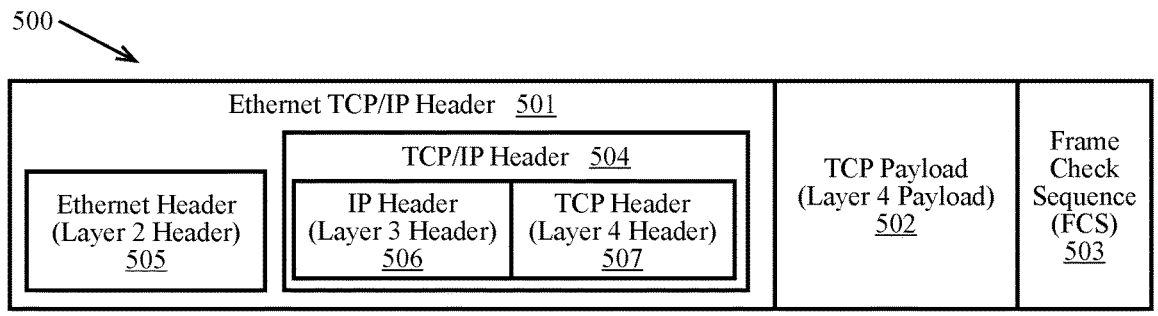
FIG. 5 illustrates a TCP/IP (transmission control protocol/internet protocol) packet that may be processed according to some aspects.

FIG. 5 illustrates a TCP/IP (transmission control protocol/internet protocol) packet 500 that may be processed according to some aspects. Ethernet packets, such as TCP/IP Ethernet packet 500, have an Ethernet header 505 and a frame check sequence (FCS) 503. As discussed above, Ethernet is a layer 2 protocol. An Ethernet TCP/IP header 501 has an Ethernet header 505 and a TCP/IP header 504. The TCP/IP header 504 has an IP header 506 and a TCP header 507. The Ethernet TCP/IP packet has a TCP payload 502 as the layer 4 payload.

Figure 6:
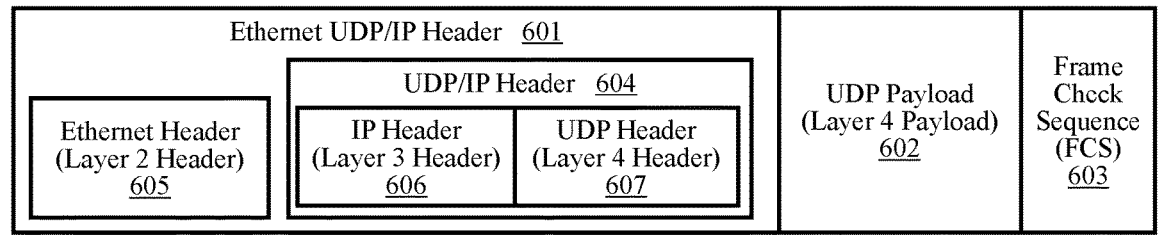
FIG. 6 illustrates a UDP/IP (user datagram protocol/internet protocol) packet that may be processed according to some aspects.

FIG. 6 illustrates a UDP/IP (user datagram protocol/internet protocol) packet that may be processed according to some aspects. Ethernet packets, such as UDP/IP Ethernet packets, have an Ethernet header 605 and a frame check sequence (FCS) 603. As discussed above, Ethernet is a layer 2 protocol. An Ethernet UDP/IP header 601 has an Ethernet header 605 and a UDP/IP header 604. The UDP/IP header 604 has an IP header 606 and a UDP header 607. The Ethernet UDP/IP packet has a UDP payload 602 as the layer 4 payload.

Figure 7:
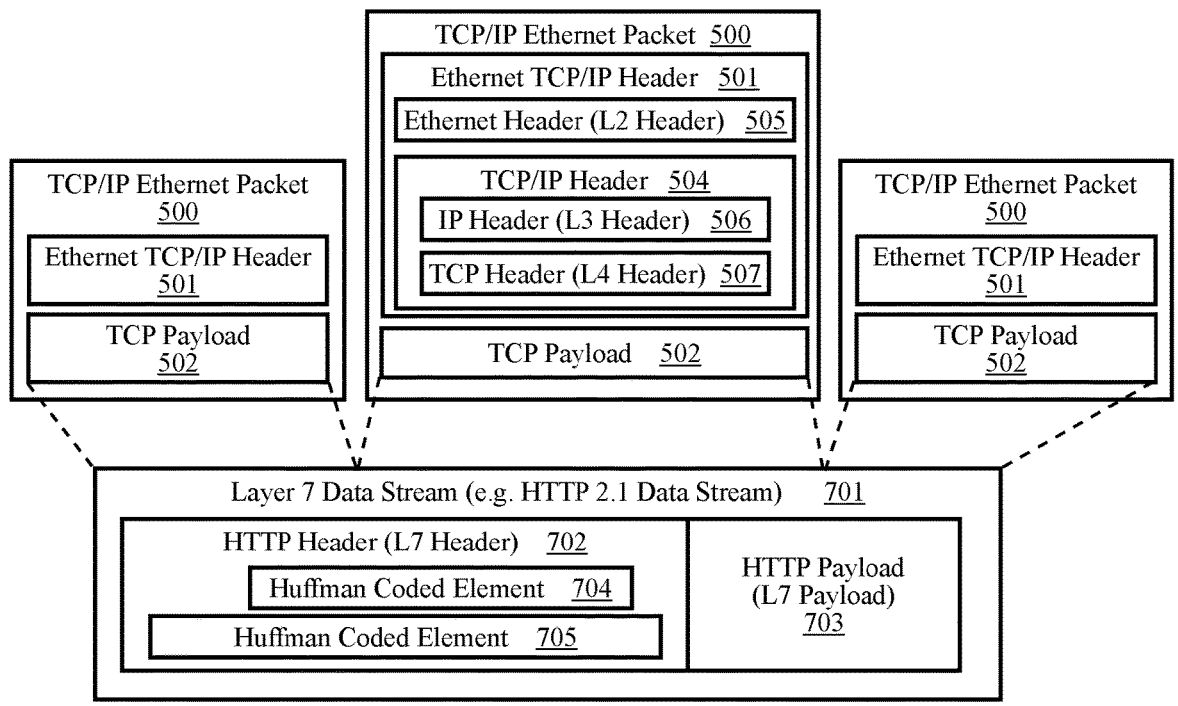
FIG. 7 illustrates a layer 7 data stream carried by TCP packets according to some aspects.

FIG. 7 illustrates a layer 7 data stream 701 carried by TCP packets 500 according to some aspects. Numerous TCP/IP payloads 502 of numerous TCP/IP packets 500 carry the L7 data stream 701 with different packets carrying different parts of the L7 data stream 701. The L7 data stream is illustrated as being a HTTP 2.1 data stream having a HTTP header 702 and HTTP payload 703. The HTTP header 702 contains a first Huffman coded element 704 and a second Huffman coded element 705. Huffman coding is a well-known data compression technique and the use of Huffman coding to compress HTTP headers is specified in IETF RFCs such as RFC 7541 which is titled "HPACK: Header Compression for HTTP/2". The IETF (Internet Engineer Task Force) is a consortium that develops and publishes standards for the Internet in the form of RFCs (requests for comment).

Figure 8:
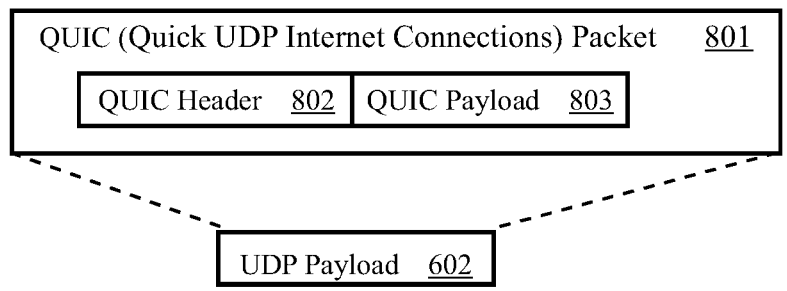
FIG. 8 illustrates a QUIC (quick UDP Internet connection) packet within a UDP payload according to some aspects.

FIG. 8 illustrates a QUIC (quick UDP Internet connection) packet 801 within a UDP payload 602 according to some aspects. The QUIC packet 801 includes a QUIC header 802 and a QUIC payload 803. The IETF document "QUIC: A UDP-Based Multiplexed and Secure Transport, draft-ietf-quic-transport-30" published Sep. 10, 2020 specifies QUIC. QUIC is a network protocol designed for carrying L7 data streams such as HTTP data streams. Specifically, the IETF document "QPACK: Header Compression for HTTP/3, draft-ietf-quic-qpack-17" published Sep. 10, 2020 is directed to carrying HTTP 3 data streams using QUIC packets.

Figure 9:
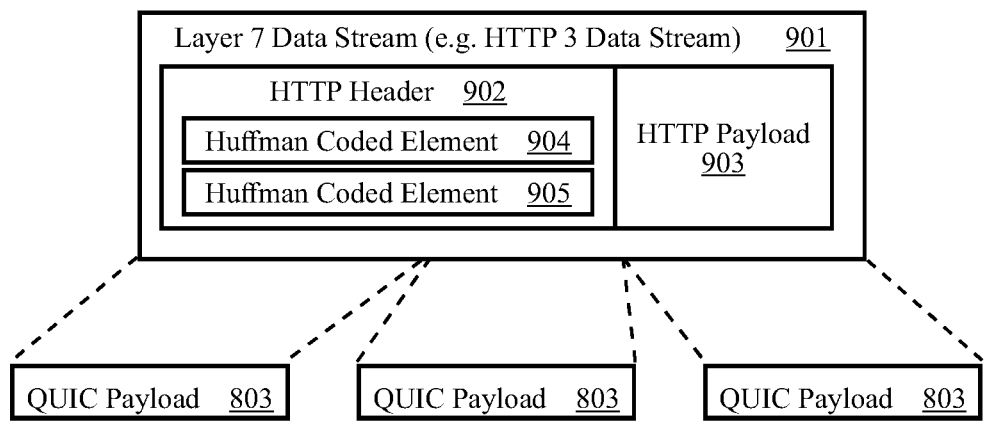
FIG. 9 illustrates a layer 7 data stream carried by QUIC packets according to some aspects.

FIG. 9 illustrates a layer 7 data stream 901 carried by QUIC packets according to some aspects. Numerous QUIC payloads 803 of numerous QUIC packets carry the L7 data stream 901 with different packets carrying different parts of the L7 data stream 901. The L7 data stream is illustrated as being a HTTP 3 data stream having a HTTP header 902 and HTTP payload 903. The HTTP header 902 contains a first Huffman coded element 904 and a second Huffman coded element 905.

Figure 10:
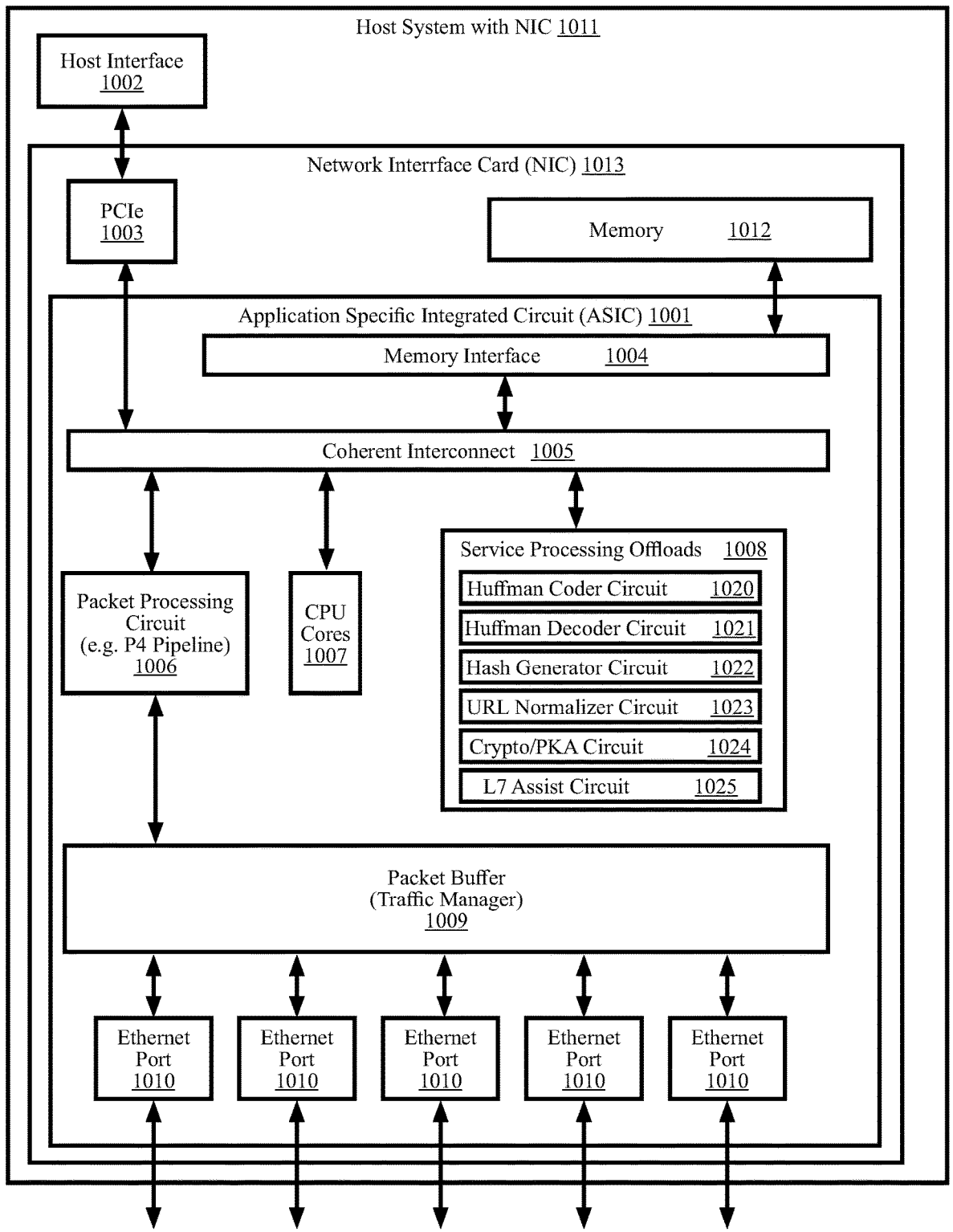
FIG. 10 is a high-level diagram of a network interface card (NIC) configured as a network appliance according to some aspects.

FIG. 10 is a high-level diagram of a network interface card (NIC) 1013 configured as a network appliance according to some aspects. Aspects of the embodiments, including packet processing pipelines, fast data paths, and slow data paths, can be implemented in the NIC 1013. The NIC 1013 can be configured for operation within a host system 1011. The host system can be a general-purpose computer with a host interface 1002 such as a PCIe interface. The NIC 1013 can have a PCIe interface 1003 through which it can communicate with the host system 1011. The NIC can also include a memory 1012 and an application specific integrated circuit (ASIC) 1001 or FPGA that implements substantial portions of a network appliance such as NIC 1013. Although a single ASIC is illustrated, the circuitry can be distributed among numerous interconnected ASICs and FPGAs. The memory 1012 can be DDR-SDRAM (Double Data Rate Synchronous Dynamic Random-Access Memory) modules or chips such as those commonly installed in computer motherboards, graphics cards, etc. The ASIC 1001 can include a memory interface 1004 for reading and writing to memory 1012. Note that in some implementations the ASIC contains a memory. The ASIC 1001 also includes a coherent interconnect 1005, a packet processing circuit implementing a packet processing pipeline (e.g. P4 pipelines) 1006, CPU cores 1007, service processing offloads 1008, packet buffer 1009, and ethernet ports 1010.

The service processing offloads 1008 are specialized hardware modules purposely optimized to handle specific tasks at wire speed, such as cryptographic functions, compression/decompression, etc. The service processing offloads 1008 include a Huffman coder circuit 1020, a Huffman decoder circuit 1021, a hash generator circuit 1022, a URL normalizer circuit 1023, a crypto/PKA circuit 1024, and a L7 assist circuit 1025. The crypto/PKA circuit 1024 can be used for hardware assisted encryption and decryption of network traffic. For example, many network traffic flows are encrypted using one of the standardized TLS (transport security protocol) protocols. The L7 assist circuit 1025 can process L7 data streams and may use other service processing offloads for such processing.

The packet processing circuit 1006 can be or include a P4 pipeline. As discussed above, P4 pipelines are configured for programming via a P4 domain-specific language for programming the data plane of network appliances that is currently defined in the "P4$_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The NIC 1013 can include a memory 1012 for running Linux or some other operating system, for storing large data structures such as flow tables and other analytics, and for providing buffering resources for advanced features including TCP termination and proxy, deep packet inspection, storage offloads, and other functions. The memory system may comprise a memory module which may support 4 GB capacity, 8 GB capacity, or some other capacity depending on packaging.

In an embodiment, the CPU cores 1007 are general purpose processor cores, such as ARM processor cores, MIPS (Microprocessor without Interlocked Pipeline Stages) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 1007 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 1007 available for control plane functions and for implementing aspects of a slow data path that includes software implemented packet processing functions. The CPU cores may be used to implement discrete packet processing operations such as L7 applications (e.g., HTTP proxy server such as Envoy or HAProxy, HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4.

The packet buffer 1009 can act as a central on-chip packet switch that delivers packets from the network interfaces 1010 to packet processing elements of the data plane and vice-versa. The packet processing elements can include a slow data path implemented in software and a fast data path implemented by the packet processing circuit 1006 and service processing offloads 1008.

The packet processing circuit 1006 can implement packet processing pipelines and can be a specialized circuit or part of a specialized circuit in the ASIC 1001 to implement a programmable packet processing pipeline such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 1007 and memory 1012 are configured via software to implement a slow data path. A network appliance having two data paths has a fast data path and a slow data path when one of the data paths processes packets faster than the other data path.

All memory transactions in the ASIC, including host memory, on board memory 1012 via memory interface 1004, and registers may be connected via a coherent interconnect 1005. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit 1006, CPU cores 1007, and PCIe interface 1003. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 11:
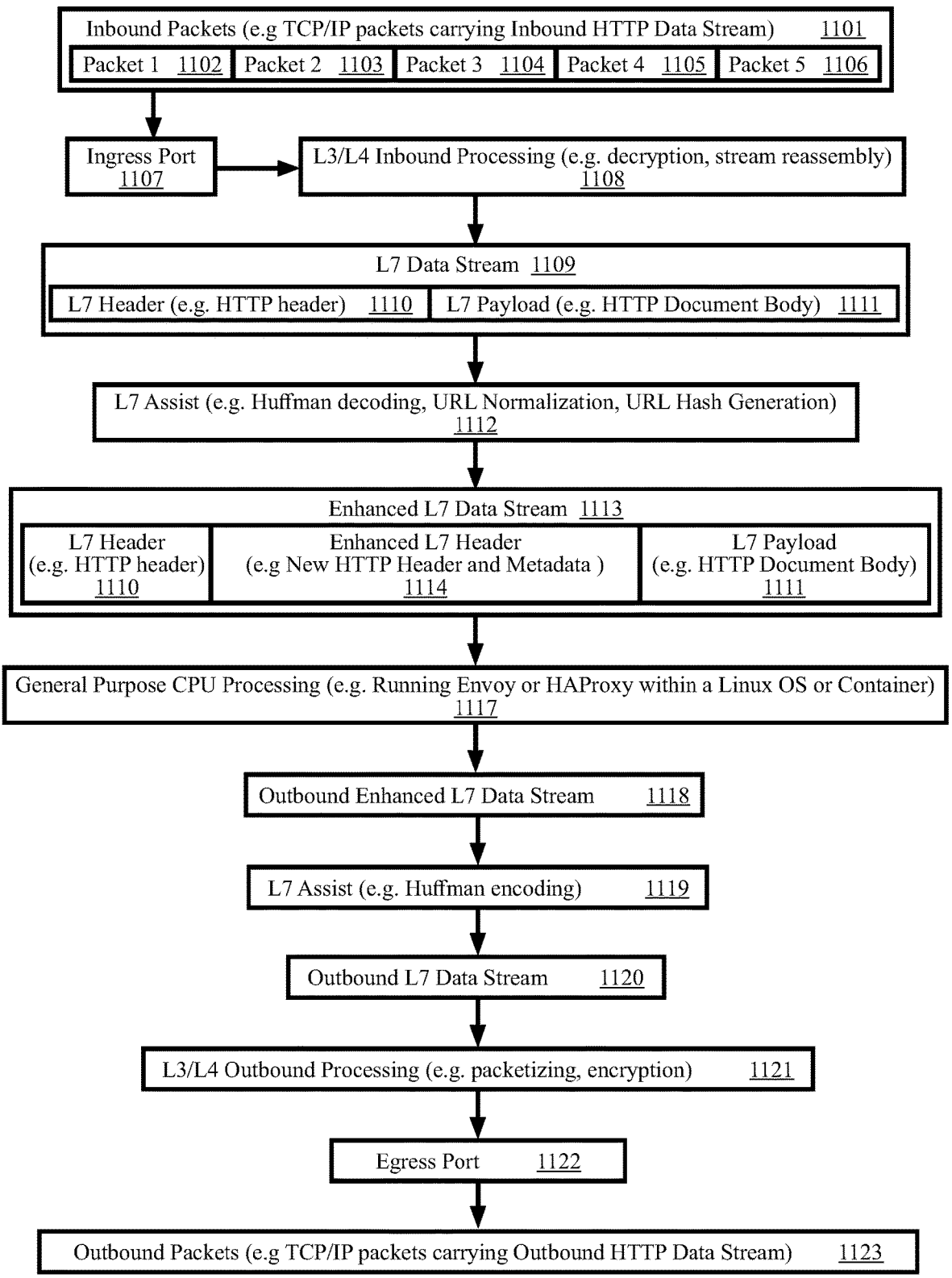
FIG. 11 is a high-level flow diagram illustrating L7 assist according to some aspects.

FIG. 11 is a high-level flow diagram illustrating L7 assist according to some aspects. Inbound network packets 1101 are received at an ingress port 1107 of a network appliance. The inbound packets 1101 can include numerous individual network packets such as packet 1 1102, packet 2 1103, packet 3 1104, packet 4 1105, and packet 5 1106. For example, the inbound packets can be TCP/IP packets carrying an inbound HTTP data stream. L3 (layer 3) and L4 (layer 4) inbound processing 1108 can reassemble a L7 data stream 1109 from the inbound packets 1101. The L3/L4 inbound processing 1108 may include a decryption step because the inbound packets 1101 may be encrypted via TLS or another protocol. The L7 data stream 1109 can have an L7 header 1110 and a L7 payload 1111. In one example, the L7 data stream 1109 is a HTTP data stream wherein the L7 header 1110 is an HTTP header and the L7 payload 1111 is an HTTP document body.

The L7 data stream 1109 can be processed via L7 assist 1112 to produce an enhanced L7 data stream 1113. For an inbound L7 data stream 1109, L7 assist 1112 can include Huffman decoding, URL normalization, and URL hash generation. The enhanced L7 data stream can include the original L7 header 1110, the original L7 payload 1111, and an enhanced L7 header 1114. The enhanced L7 header 1114 can be an enhanced version of the original L7 header 1110 with the enhancements including Huffman decoding and URL normalization. In addition, the enhanced L7 header 1114 can include metadata such as a hash of a normalized URL. For example, HTTP headers can include a URL indicating a HTTP server location and specific content location on the HTTP server. URL normalization can rewrite all, or a portion of, a URL such that a specific location is always written the same way. Normalizing URLs can result in more effective data compression via, for example, Huffman coding. Another benefit of normalized URLs is that one specific hash value, a URL hash, indicates a specific resource location when that same location is always specified via the same URL. Without URL normalization, two or more URLS may be used to indicate the same location. The two or more URLs result in two or more URL hash values. The hash values can be computed using one of the commonly used hash functions such as CRC-32. For example, the URL hash can be the lower 24 bits of a CRC-32 computation produced from the normalized URL.

The enhanced L7 data stream 1113 can be processed using general purpose CPUs 1117. For example, the general-purpose CPUs may be running a Linux operating system using a HTTP proxy (e.g. Envoy or HAProxy) to process the enhanced L7 data stream. The HTTP proxy may be enhanced to use the enhanced L7 header 1114. For example, when using the original HTTP header, a HTTP proxy must parse a URL before determining what action to take. When a URL hash is available in an enhanced L7 header, the HTTP proxy can determine what action to take by simply using the URL hash as an index into a table. As such, a HTTP proxy can process enhanced HTTP data streams faster than it can process regular HTTP data streams.

The general-purpose CPU processing 1117 can take an enhanced L7 data stream 1113 as input and can produce one or more outbound enhanced L7 data stream 1118. L7 assist 1119 can process the outbound enhanced L7 data stream 1118 to produce an outbound L7 data stream 1120. For example, the L7 assist 1119 can remove the enhanced L7 header and can Huffman code the outbound HTTP header. L3/L4 outbound processing 1121 can packetize the outbound L7 data stream 1120 and apply encryption such as that required by a TLS protocol. Packetizing is a process whereby a data stream that cannot fit into a single packet is split into numerous packets. The egress port 1122 can transmit the outbound L7 data stream 1120 in a number of outbound packets 1123. For example, when the outbound L7 data stream 1120 is an outbound HTTP data stream, the outbound packets 1123 can be TCP/IP packets carrying the outbound HTTP data stream.

Figure 12:
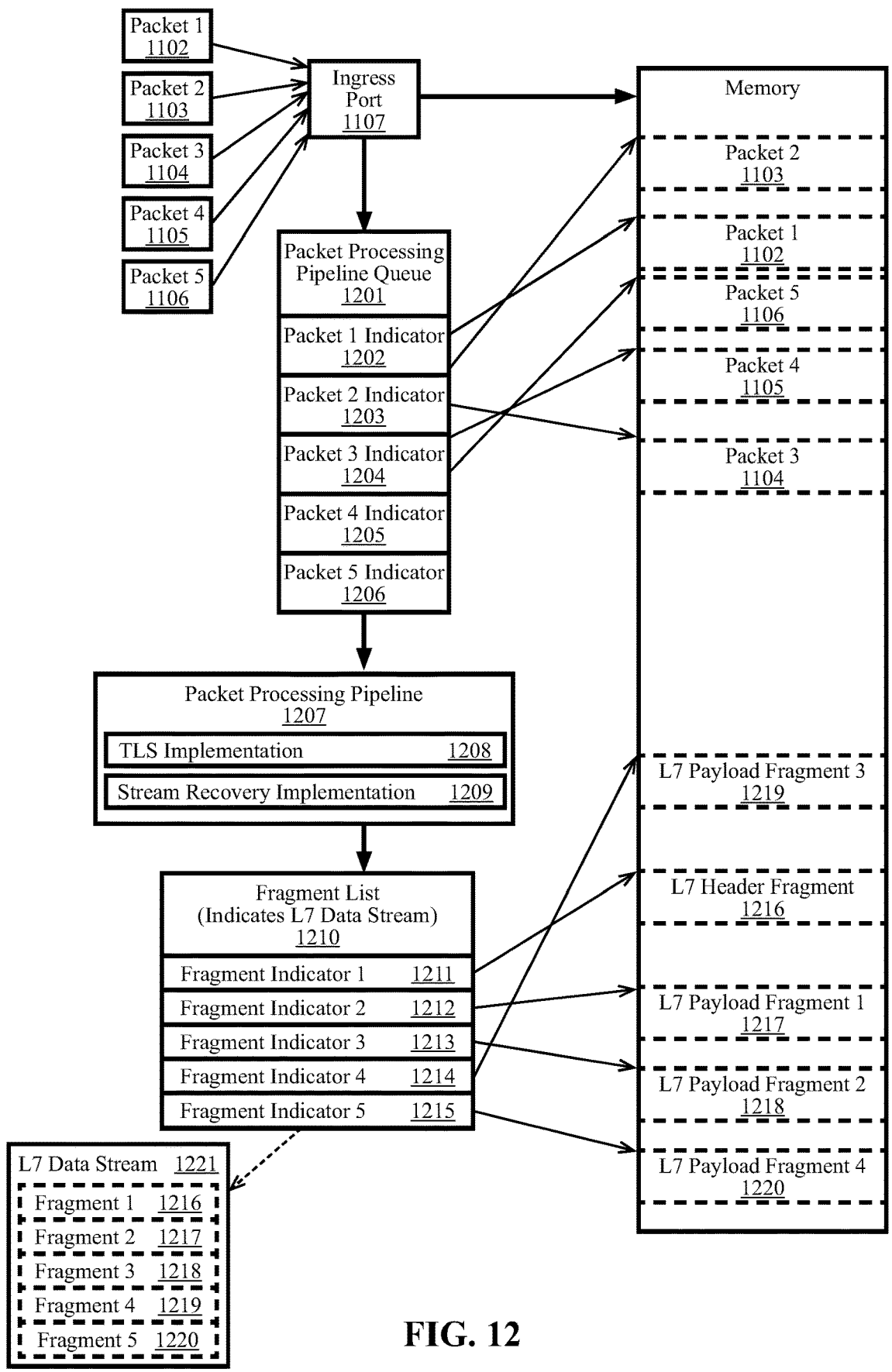
FIG. 12 is a conceptual diagram of an L7 data stream reassembled from network packets according to some aspects.

FIG. 12 is a conceptual diagram of an L7 data stream reassembled from network packets according to some aspects. An ingress port 1107 receiving network packets 1102, 1103, 1104, 1105, 1106 can store the packets in memory and can place a packet indicator for each packet in a packet processing pipeline input queue 1201. A packet indicator can be a pointer to the memory location where the packet is stored, a data structure having such a pointer, etc. The packet processing pipeline queue 1201 has an indicator for each of the network packets. Packet 1 indicator 1202 indicates the memory location of packet 1 1102. Packet 2 indicator 1203 indicates the memory location of packet 2 1103. Packet 3 indicator 1204 indicates the memory location of packet 3 1104. Packet 4 indicator 1205 indicates the memory location of packet 4 1105. Packet 5 indicator 1206 indicates the memory location of packet 5 1106.

The packet processing pipeline queue 1201 queues packets for processing by a packet processing pipeline 1207, such as a configurable hardware implemented P4 packet processing pipeline having match-action units. The packet processing pipeline 1207 can have a TLS implementation 1208 for decrypting packets and a stream recovery implementation 1209 for recovering L7 data streams. A L7 data stream 1221 is conceptually a continuous string of data, but in practice can be stored in memory as a number of fragments. The L7 data stream can be produced as a single string of data by catenating the fragments. Conceptually, the L7 data stream 1221 is a continuous string of data wherein the data in fragment 1 1216 comes first, the data in fragment 2 1217 comes second, the data in fragment 3 1218 comes third, the data in fragment 4 1219 comes fourth, and the data in fragment 5 1220 comes fifth. In practice, the L7 data stream 1221 is indicated by a fragment list 1210. The fragment list 1210 indicates the L7 data stream 1221 via fragment indicators. Fragment indicator 1 1211 indicates the memory location of the first piece of the L7 data stream, which is a L7 header fragment 1216. Fragment indicator 2 1212 indicates the memory location of the second piece of the L7 data stream, which is L7 payload fragment 1 1217. Fragment indicator 3 1213 indicates the memory location of the third piece of the L7 data stream, which is L7 payload fragment 2 1218. Fragment indicator 4 1214 indicates the memory location of the fourth piece of the L7 data stream, which is L7 payload fragment 3 1219. Fragment indicator 5 1215 indicates the memory location of the fifth piece of the L7 data stream, which is L7 payload fragment 4 1220. For clarity, header data and payload data are shown as stored in different fragments. In practice, a fragment can include header data followed by payload data. FIG. 12 shows the fragments and the packets at different locations in memory. In practice, the fragments can be inside the packets in memory. For example, the header fragment 1216 may be the layer 4 payload of packet 1 1102. In such an example, fragment indicator 1 1211 could point directly to the L4 payload of packet 1.

Figure 13:
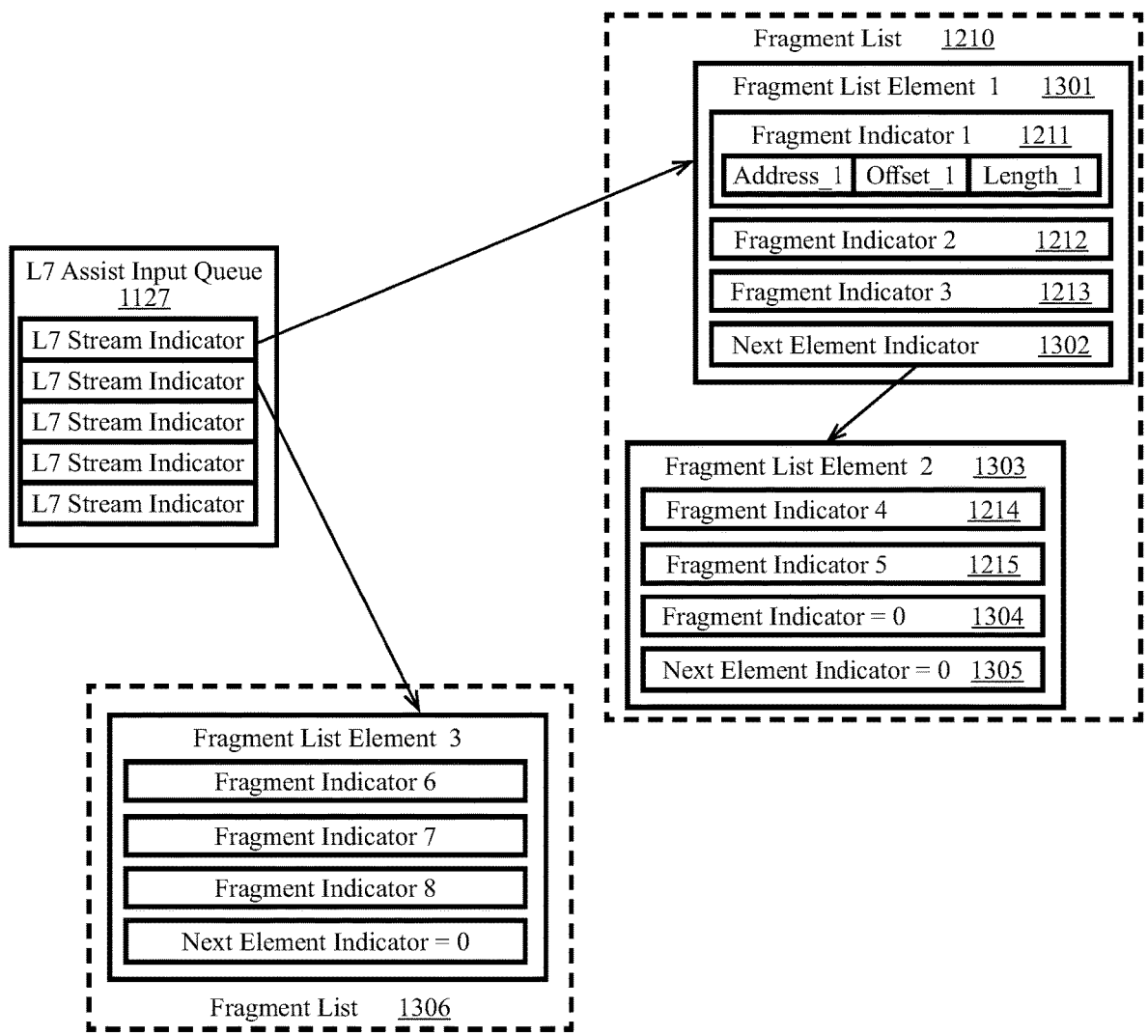
FIG. 13 illustrates a L7 assist input queue indicating L7 data streams via fragment lists according to some aspects.

FIG. 13 illustrates a L7 assist input queue 1127 indicating L7 data streams via fragment lists according to some aspects. A first L7 stream indicator indicates a first L7 data stream 1221 via a first fragment list 1210 while a second L7 stream indicator indicates a second L7 data stream via a second fragment list 1306. A fragment list 1210 can be implemented as a linked list of fragment list elements 1301, 1303. Fragment list element 1 1301 can include fragment indicator 1 1211, fragment indicator 2 1212, fragment indicator 3 1213, and a next element indicator 1302. The next element indicator can indicate the memory location of fragment list element 2 1303, which is the next fragment list element in the linked list. Fragment list element 2 1303 can include fragment indicator 4 1214 and fragment indicator 5 1215. The third fragment indicator in fragment list element 2 1303 can be set to zero to flag that there is no fragment indicated. The next element indicator 1305 in fragment list element 2 1303 can be set to zero to indicate that fragment list element 2 1303 is the last element in the linked list. A fragment indicator, such as fragment indicator 1 1211, can use an address, offset, and length to indicate a fragment. The address can indicate a memory block. The offset can indicate the location of the fragment within the block. The length can indicate the length of the fragment. The term "AOL" is sometimes used as a shorthand for "fragment indicator" because of the first letters of Address, Offset, and Length. The next element indicator may be an address or may be an AOL structure.

Figure 14:
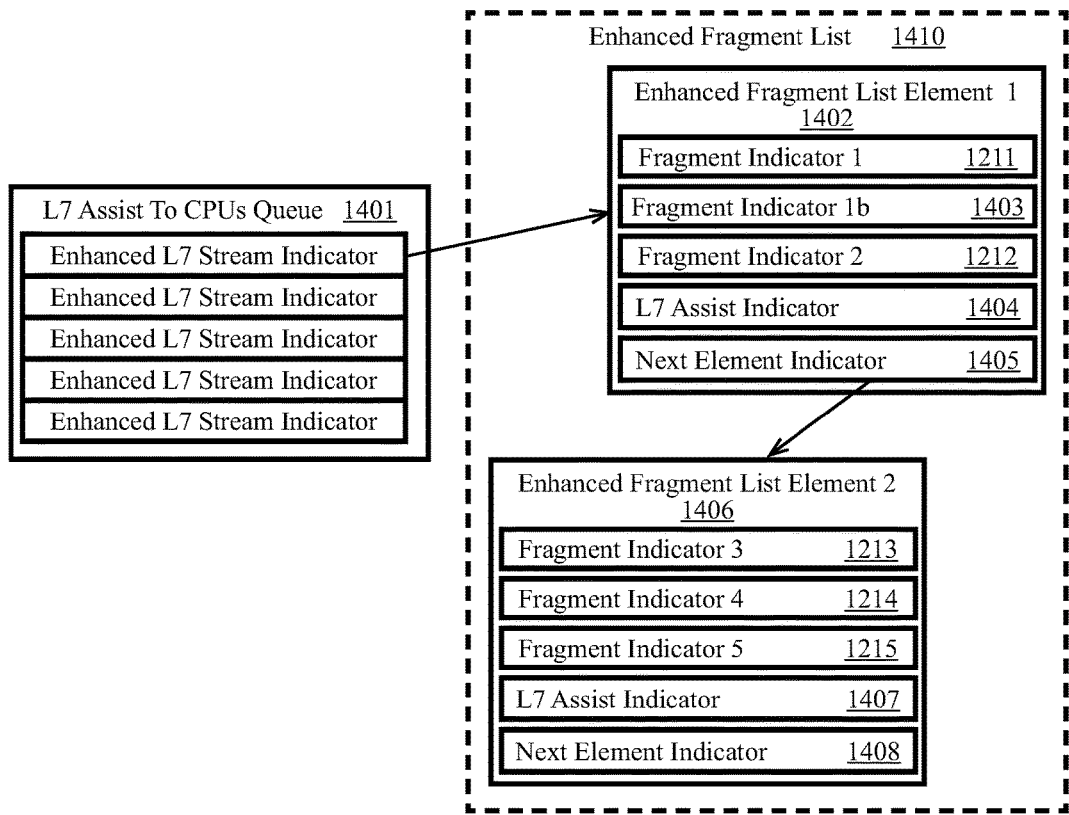
FIG. 14 illustrates a L7 assist to CPUs queue indicating enhanced L7 data streams via enhanced fragment lists according to some aspects.

FIG. 14 illustrates a L7 assist to CPUs queue 1401 indicating enhanced L7 data streams via enhanced fragment lists according to some aspects. The L7 assist to CPUs queue 1401 can be produced by the L7 assist and can be an input queue for the general-purpose processors. Using fragment lists makes it easy to insert an enhanced L7 header into a L7 data stream 1210 to produce an enhanced L7 data stream 1501. A first enhanced L7 stream indicator indicates a first enhanced L7 data stream via an enhanced fragment list 1410. The enhanced fragment list 1410 can be implemented as a linked list of enhanced fragment list elements 1402, 1406. Enhanced fragment list element 1 1402 can include fragment indicator 1 1211, fragment indicator 1b 1403, fragment indicator 2 1212, L7 assist indicator 1404, and a next element indicator 1405. The next element indicator can indicate the memory location of enhanced fragment list element 2 1406, which is the next fragment list element in the linked list. Enhanced fragment list element 2 1406 can include fragment indicator 3 1213, fragment indicator 4 1214, fragment indicator 5 1215, L7 assist indicator 1407, and a next element indicator 1408. Setting a next element indicator 1408 to zero indicates there are no more enhanced fragment list elements in the linked list.

Figure 15:
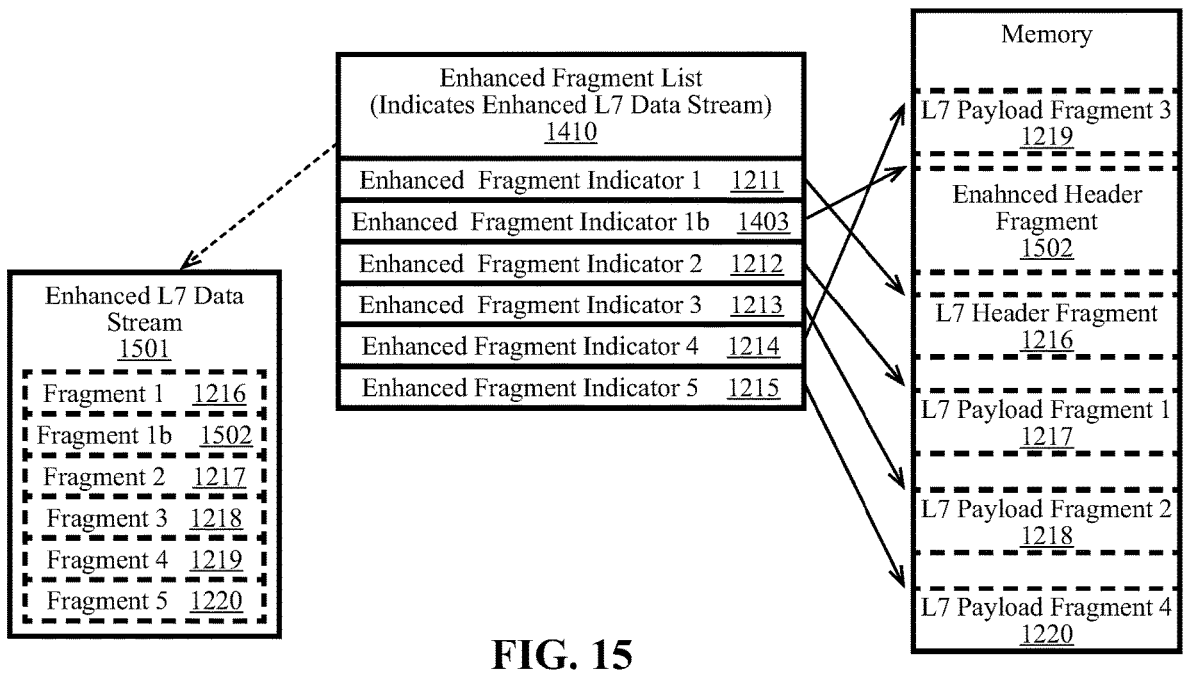
FIG. 15 illustrates an enhanced fragment list indicating an enhanced L7 data stream according to some aspects.

FIG. 15 illustrates an enhanced fragment list 1410 indicating an enhanced L7 data stream 1501 according to some aspects. Conceptually, an enhanced L7 data stream is a continuous string of data whereas in practice it may be stored in memory as a number of fragments. An enhanced L7 data stream 1501 is conceptually a continuous string of data, but in practice can be stored in memory as a number of fragments. The enhanced L7 data stream can be produced as a single string of data by catenating the fragments. Conceptually, the enhanced L7 data stream 1221 is a continuous string of data wherein the data in fragment 1 1216 comes first, the data in fragment 1b 1502 comes second, the data in fragment 2 1217 comes third, the data in fragment 3 1218 comes fourth, the data in fragment 4 1219 comes fifth, and the data in fragment 5 1220 comes sixth. In practice, the enhanced L7 data stream 1501 is indicated by an enhanced fragment list 1410. The enhanced fragment list 1410 indicates the enhanced L7 data stream 1501 via enhanced fragment indicators. Enhanced fragment indicator 1 1211 indicates the memory location of the first piece of the enhanced L7 data stream, which is a L7 header fragment 1216. Enhanced fragment indicator 1b 1403 indicates the memory location of the second piece of the enhanced L7 data stream, which is the enhanced header fragment 1502. Enhanced fragment indicator 2 1212 indicates the memory location of the third piece of the enhanced L7 data stream, which is payload fragment 1 1217. Enhanced fragment indicator 3 1213 indicates the memory location of the fourth piece of the enhanced L7 data stream, which is payload fragment 2 1218. Enhanced fragment indicator 4 1214 indicates the memory location of the fifth piece of the enhanced L7 data stream, which is payload fragment 3 1219. Enhanced fragment indicator 5 1215 indicates the memory location of the sixth piece of the enhanced L7 data stream, which is payload fragment 4 1220. The data structure for the enhanced fragment indicators can be identical to those of the fragment indicators, e.g. the "AOL" data structure discussed above.

Figure 16:
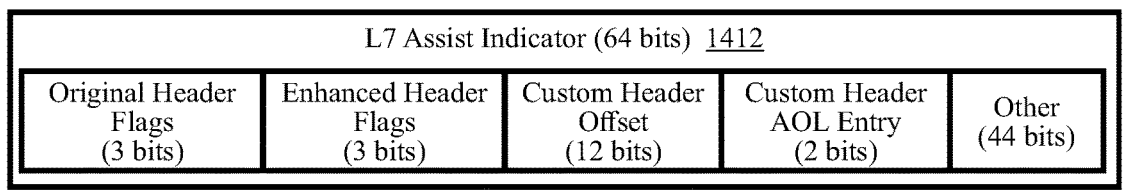
FIG. 16 illustrates a L7 assist indicator according to some aspects.

FIG. 16 illustrates a L7 assist indicator 1412 according to some aspects. The illustrated L7 assist indicator 1412 is customized for enhanced fragment list elements having three enhanced fragment indicators. The original header flags can be a three bit mask indicating which, if any, of the fragment indicators indicates data from the original L7 header. The enhanced header flags can be a three bit mask indicating which, if any, of the fragment indicators indicates data from an enhanced L7 header. A single fragment can contain original L7 header data and enhanced L7 header data. As such, L7 assist indicator 1412 provides data fields for locating such enhanced L7 header data. The custom header AOL entry can be a three bit mask indicating which, if any, of the three fragments contains both original L7 header data and enhanced L7 header data. The custom header offset indicates where in the fragment the enhanced L7 header begins.

In an implementation, the fragment indicators include a 64 bit address, a 32 bit offset, and a 32 bit length. The next element indicator is 64 bits. The fragment list elements are therefore 448 bits. The memory may be configured for 512 bit words. As such, the fragment list elements are sized to hold as many fragment indicators as possible within a single 512 bit word. Sizing data structures to match memory word size optimizes the use of memory and the number of memory operations related to reading and writing fragment list elements. The enhanced L7 assist indicator described above is also sized such that the enhanced fragment list elements fit within 512 bit memory words.

Figure 17:
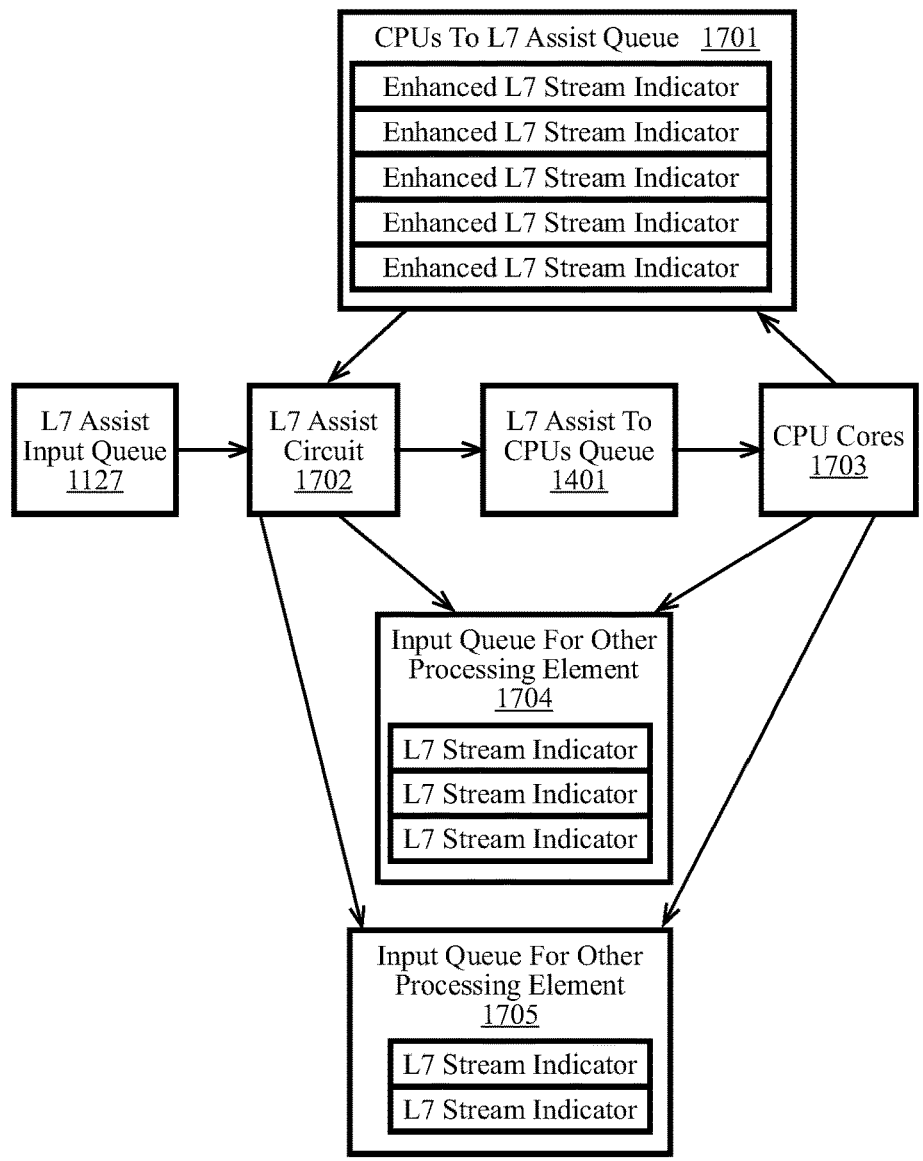
FIG. 17 illustrates input queues for an L7 assist circuit and for CPU cores according to some aspects.

FIG. 17 illustrates input queues for an L7 assist circuit 1702 and for CPU cores 1703 according to some aspects. The L7 assist circuit's input queues can include a L7 assist input queue 1127 populated by a packet processing pipeline with inbound L7 data streams and can include a CPUs to L7 assist queue 1701 populated by the CPUs with outbound enhanced L7 data streams. The L7 assist circuit 1702 can add inbound enhanced L7 data streams to a L7 assist to CPUs queue 1401 and can add items to input queues for other processing elements 1704, 1705. The CPU cores' 1703 input queues can include the L7 assist to CPUs queue 1401 populated with inbound enhanced L7 data streams. The CPU cores 1703 can add outbound enhanced L7 data streams to the CPU to L7 assist queue 1701 and can add items to input queues for other processing elements 1704, 1705.

Figure 18:
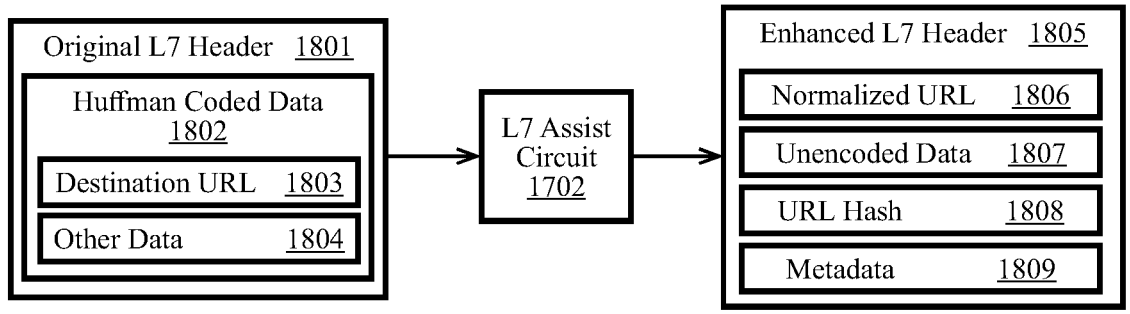
FIG. 18 illustrates an L7 assist circuit processing an L7 header according to some aspects.

FIG. 18 illustrates an L7 assist circuit 1702 processing an L7 header 1801 according to some aspects. An original L7 header 1801 can include Huffman coded data 1802. The Huffman coded data 1802 can include a destination URL 1803 and other data 1804. The L7 assist circuit 1702 can process the original L7 header 1801 to produce an enhanced L7 header 1805. The enhanced L7 header can include a normalized URL 1806, unencoded data 1807 (Huffman decoded), a URL hash 1808, and other metadata 1809.

Figure 19:
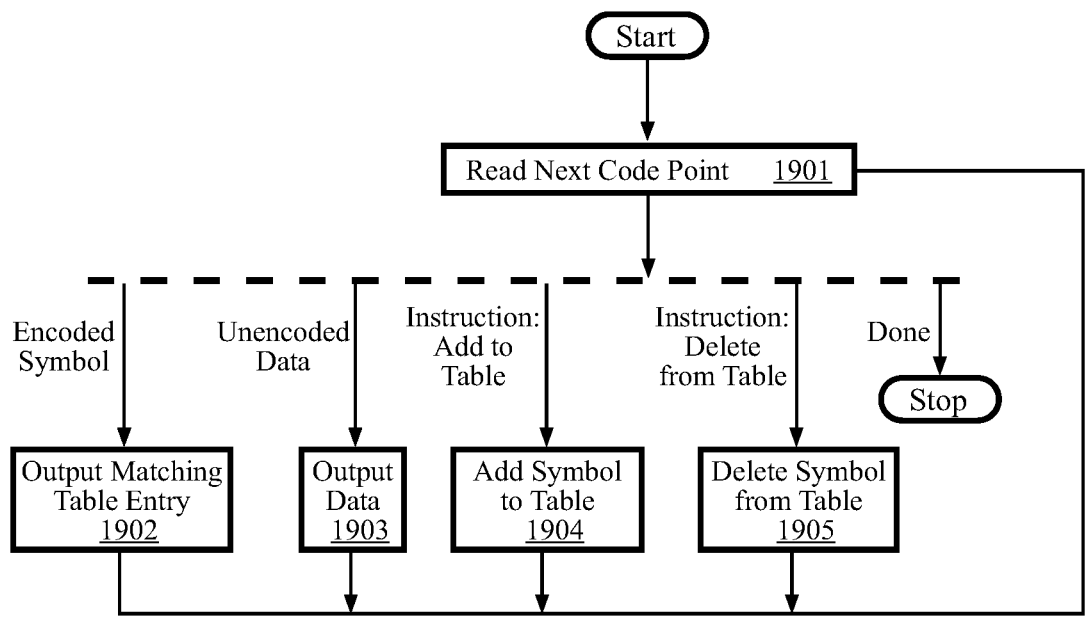
FIG. 19 is a high-level conceptual diagram of a Huffman decoding process according to some aspects.

FIG. 19 is a high-level conceptual diagram of a Huffman decoding process according to some aspects. The example of FIG. 19 is a non-limiting example. After the start, a code point is read 1901 and an action is taken based on the code point before the process loops back to reading the next code point 1901. If the code point is an encoded symbol, then the matching table entry in a Huffman decoding table is output

1902. If the code point is unencoded data, then the unencoded data is output 1903. If the code point is an instruction to add a symbol and element to the decoding table, then the symbol and element are added to the table 1904. If the code point is an instruction to delete a symbol from the decoding table, then the symbol is deleted 1906. If the process is done, it stops.

Figure 20:
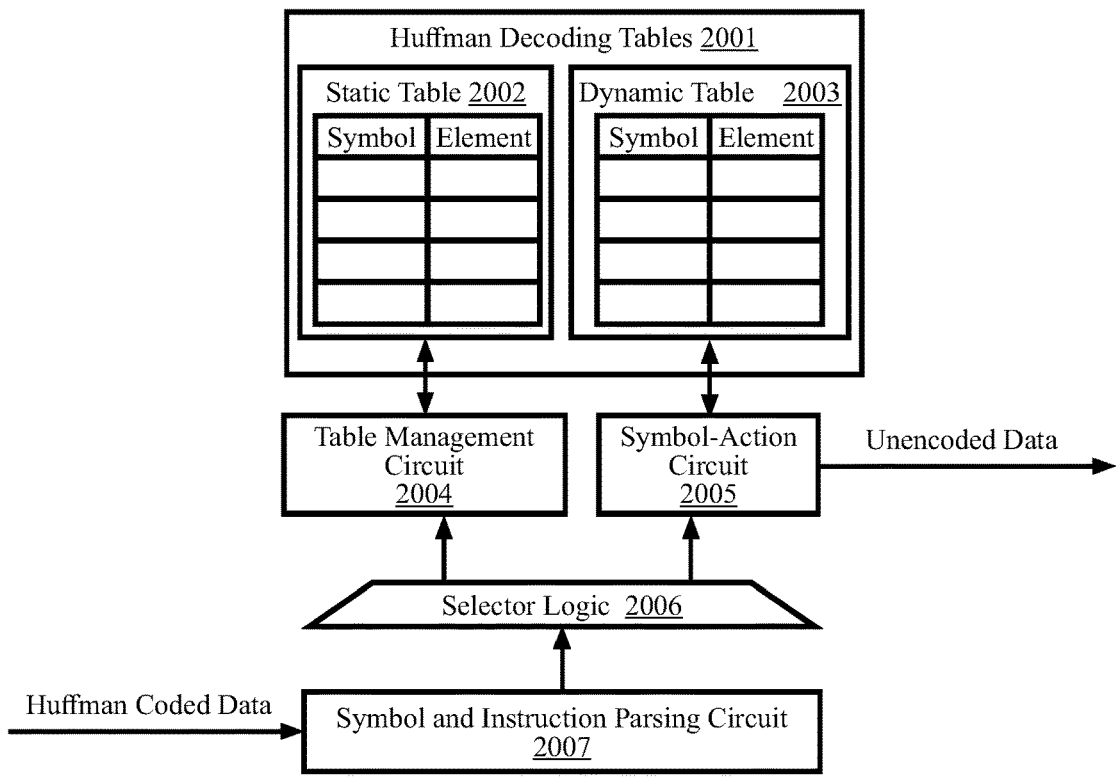
FIG. 20 is a high-level illustration of a Huffman decoding circuit that can implement the process of FIG. 19 according to some aspects.

FIG. 20 is a high-level illustration of a Huffman decoding circuit that can implement the process of FIG. 19 according to some aspects. The Huffman coding tables 2001 can include a static table 2002 and a dynamic table 2003. IETF RFC 7541 defines a static table and discusses a dynamic table for use in Huffman coding and decoding. A symbol and instruction parsing circuit 2007 can receive a stream of Huffman coded data. The symbol and instruction parsing circuit 2007 parses out the code points in the Huffman coded data stream and provides them to selector logic 2006. If the code point is a symbol, then the selector logic 2006 passes it to a symbol-action circuit 2005. The symbol-action circuit determines which element in the Huffman coding tables 2001 is associated with the symbol and outputs that element in the unencoded data stream. If the code point is an instruction, the selector logic 2006 passes it the table management circuit 2004. The table management circuit 2004 can execute instructions to add symbols to the dynamic table 2003 and to delete symbols from the dynamic table 2003.

Figure 21:
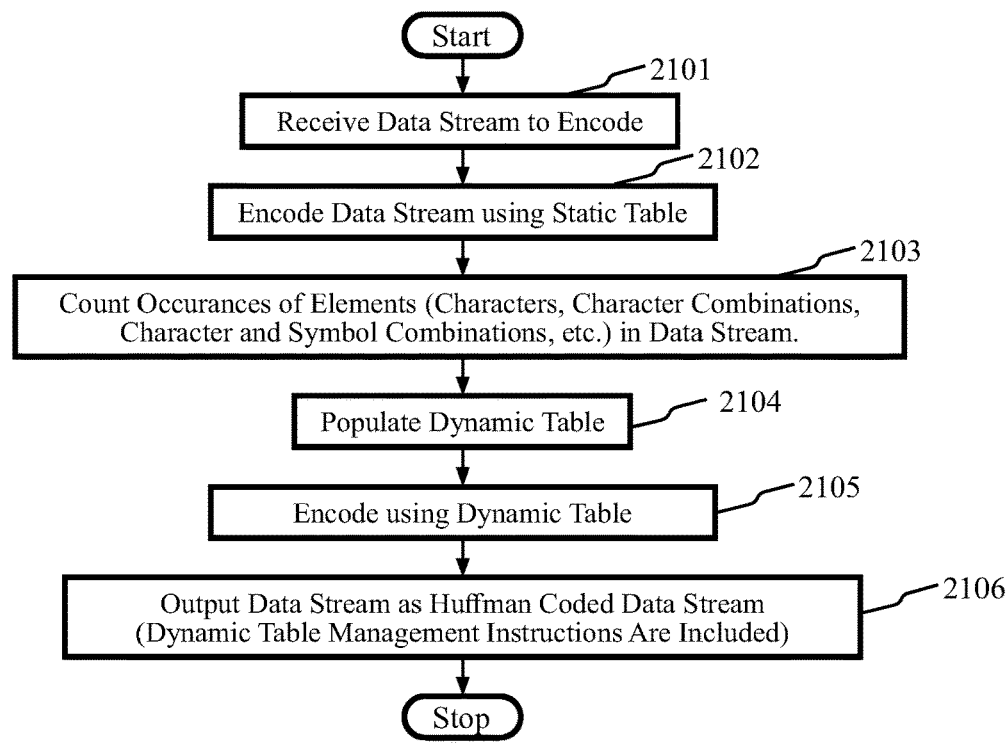
FIG. 21 is a high-level conceptual diagram of a Huffman coding process according to some aspects.

FIG. 21 is a high-level conceptual diagram of a Huffman coding process according to some aspects. As with all the examples herein, the example of FIG. 21 is non-limiting. After the start, a data stream to encode is received 2101. At block 2102 the data stream is encoded using the static table. At block 2103 the process can count the number of occurrences of elements in the data stream. The elements can be characters, character combinations, character and symbol combinations, etc. At block 2104 the dynamic table is populated based on the number of occurrences of elements in the data stream. At block 2105 the data stream is encoded using the dynamic table. At block 2106 the data stream is output as a Huffman coded data stream. Instructions for managing the dynamic table are included in the Huffman coded output string.

Figure 22:
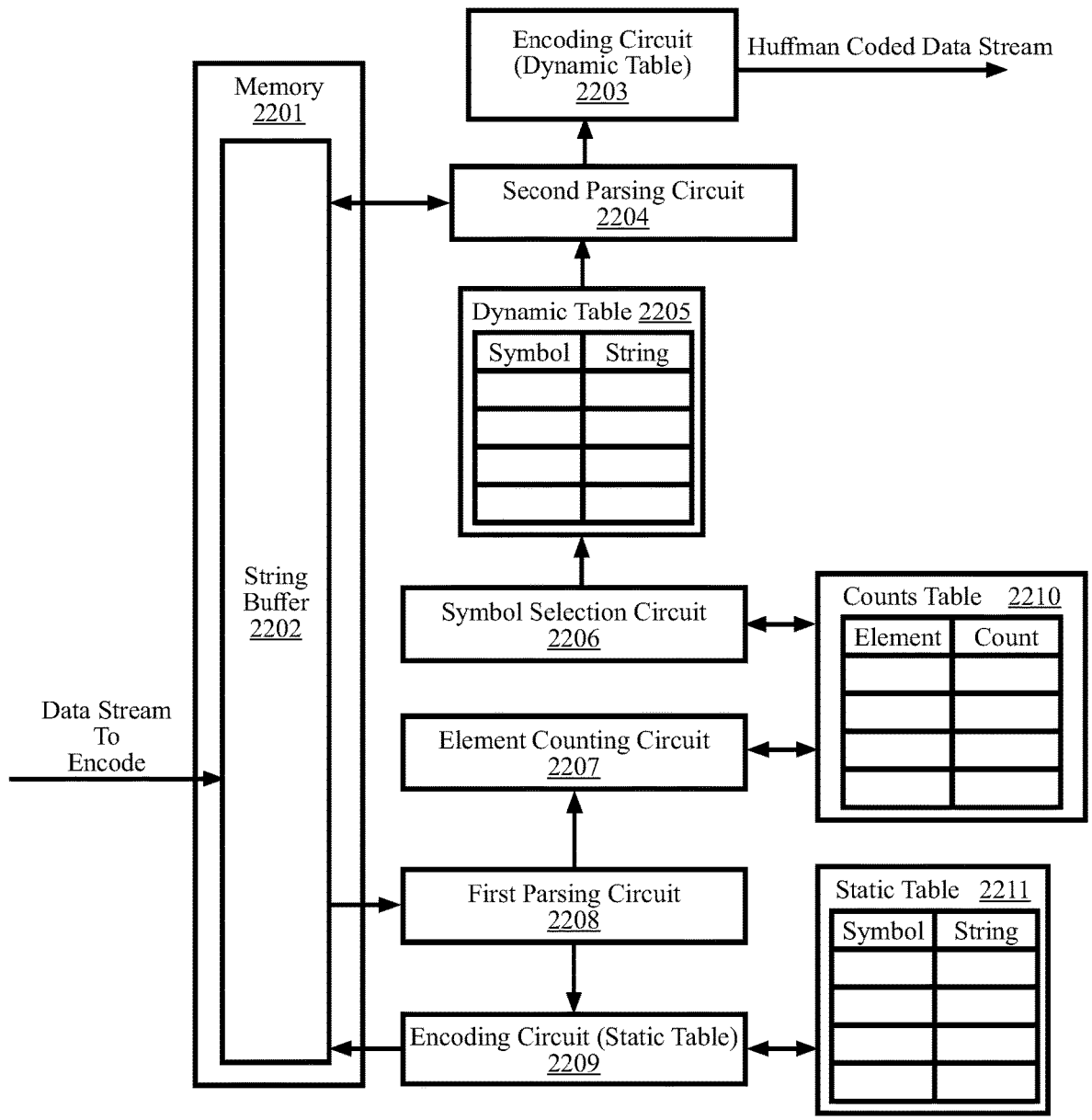
FIG. 22 is a high-level illustration of a Huffman coding circuit that can implement the process of FIG. 21 according to some aspects.

FIG. 22 is a high-level illustration of a Huffman coding circuit that can implement the process of FIG. 21 according to some aspects. The data stream to encode can be received and stored in a string buffer 2202 in memory 2201. The static table 2211 stores strings in association with symbols. A first parsing circuit 2208 can find occurrences of the static table strings in the data stream. A first encoding circuit 2209 can replace the occurrences of the static table strings with the symbols associated with the strings in the static table 2211. The first parsing circuit can also find elements (e.g. sequences of characters, symbols, or both) in the data stream and an element counting circuit 2207 can accumulate counts of the number of times those sequences occur using a counts table 2210 by incrementing counters associated with the elements. A symbol selection circuit 2206 can select the most common elements and store them in association with symbols in the dynamic table 2205. A second parsing circuit 2204 can find occurrences of the dynamic table strings in the data stream. A second encoding circuit 2203 can produce a Huffman coded data stream by replacing the occurrences of the dynamic table strings with the symbols associated with the strings in the dynamic table 2205.

FIG. 23 illustrates a non-limiting set of URL normalization examples 2301 according to some aspects. More than one normalization can be applied to the same URL. The URL normalizations can include:

1. A URL can be normalized by converting percent coded triplets to upper case. For example, "http://example-.com/f00%2a" becomes "http://example.com/f00%2A".
2. A URL can be normalized by converting the protocol and host to lower case. For example, "HTTP://User@Example.COM/Foo" becomes "http://User@example.com/Foo".
3. A URL can be normalized by decoding percent coded triplets. For example, "http://example.com/%7Efoo" becomes "http://example.com/~foo".
4. A URL can be normalized by removing dot segments. For example, "http://example.com/sna/./fu/ya/../bar" becomes "http://example.com/sna/fu/bar".
5. A URL can be normalized by converting an empty path to a "/" path. For example, "http://example.com" becomes "http://example.com/".
6. A URL can be normalized by removing a default port. For example, "http://example.com:80/" becomes "http://example.com/".
7. A URL can be normalized adding a "/" to a non-empty path. For example, "http://example.com/foo" becomes "http://example.com/foo/".
8. A URL can be normalized by removing a directory index. For example, "http://example.com/default.asp" becomes "http://example.com/" and "http://example.com/a/index.html" becomes "http://example.com/a/".
9. A URL can be normalized by removing fragment components. For example, "http://example.com/bar.html#section1" becomes "http://example.com/bar.html".
10. A URL can be normalized by replacing an IP address with a domain name. For example, "http://208.77.188.166/" becomes "http://example.com/". Note that this normalization may require a cache of IP addresses stored in association with domain names.
11. A URL can be normalized by limiting protocols. For example, "https://example.com/" becomes "http://example.com/".
12. A URL can be normalized by removing "www" as the first domain label. For example, "http://www.example.com/" becomes "http://example.com/".
13. A URL can be normalized by sorting query parameters. For example, "http://example.com/display?lang=en&article=fred" becomes "http://example.com/display?article=fred&lang=en".

FIG. 24 is a high-level conceptual diagram of a circuit that normalizes URLs according to some aspects. A URL normalization table 2401 can contain input patterns and output patterns. A URL 2407 can be received by a string buffer 2406 in memory 2405. A pattern selection and control circuit can control a pattern matching circuit 2403 that determines if the URL matches an input pattern and can control a pattern application circuit 2404 that applies an output pattern if an associated input pattern is matched. For example, the input pattern "%"{char c1}(char c2} can match all percent coded triplets. The output pattern "%"{lower(c1)}{lower(c2)}" is associated with "%"{char c1} (char c2} and outputs percent coded triplets with all the characters lower case. Similarly, the output pattern "http://"{str s} is associated with the input pattern "HTTP://"{str s} and converts "HTTP" to "http". The pattern selection and control circuit 2402 can step through all the input patterns and apply output patterns upon finding a match. Once all the input patterns have been tested, the normalized URL 2408 can be output.

Figure 25:
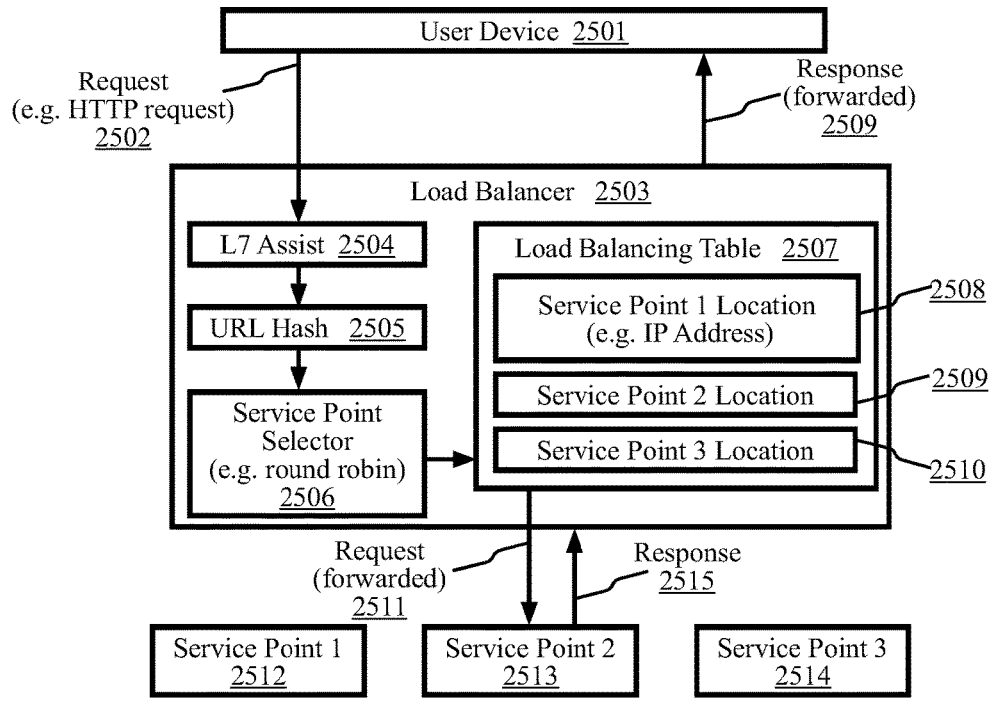
FIG. 25 is a high-level conceptual diagram of a load balancer having L7 assist circuitry that produces URL hashes to some aspects.

FIG. 25 is a high-level conceptual diagram of a load balancer 2503 having L7 assist circuitry 2504 that produces URL hashes 2505 according to some aspects. A user device 2501 sends a request 2502 to the load balancer. The request can be an HTTP request. The user device is any device attempting to access a service that is load balanced by the load balancer 2503. The service can be a web server, an element of a microservice, or some other service. The load balancer 2503 has L7 assist circuitry 2504 that produces a URL hash, as discussed above, based on the request 2502. The URL hash 2505 can be sent to a service point selector 2506. The service point selector 2506 can select a service point for servicing the request. For example, the service point can determine an index into the load balancing table 2507 using a round robin algorithm or a hash of some changing value such as a timestamp or an identifier used internally by the load balancer to reference the request. The load balancing table can store service point locations such as the IP addresses of the service points. In the non-limiting example of FIG. 25, the load balancing table contains a service point 1 location 2508 of service point 1 2512, a service point 2 location 2509 of service point 2 2513, and a service point 3 location 2510 of service point 3 2514. The request 2511 is forwarded to service point 2 2513 which sends a response 2515. The load balancer can forward the response 2509 to the user device 2501.

Figure 26:
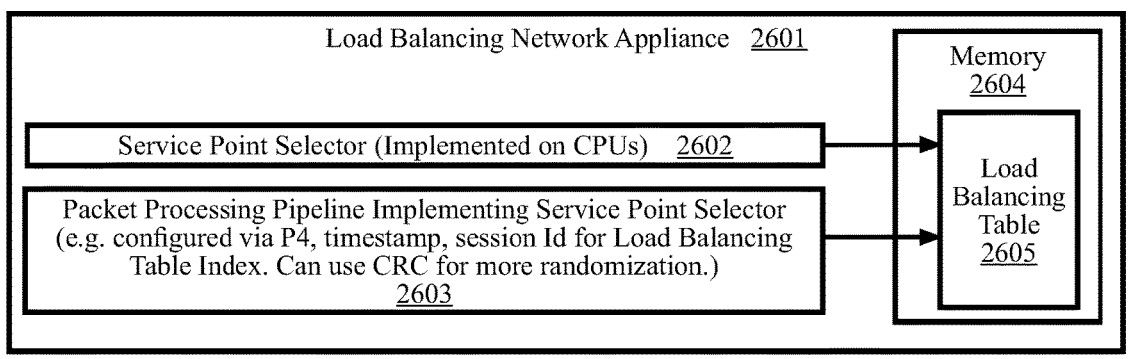
FIG. 26 is a high-level conceptual diagram of a load balancing network appliance implementing data plane and control plane load balancing functions according to some aspects.

FIG. 26 is a high-level conceptual diagram of a load balancing network appliance 2601 implementing data plane and control plane load balancing functions according to some aspects. A network appliance having a packet processing pipeline can implement a load balancer completely in the data plane or can use the CPU cores to implement some load balancing functions. For example, load balancers running on the CPU cores, such as Envoy or HAProxy, can be enhanced to use a URL hash in an enhanced L7 header, thereby speeding their load balancing functions. Such load balancers have CPU implemented service point selectors 2602. Alternatively, the network appliance can have a packet processing pipeline implemented service point selector 2603. For example, an index into the load balancing table can be determined using data in the packet header vector such as a timestamp, or using metadata associated with the request such as a session or flow identifier (often a hash of the packet 5-tuple). A hash (e.g. CRC32) function can be used to further randomize the selected index. Service point selectors implemented via the CPU cores or the packet processing pipeline can implement a round robin algorithm that counts modulo the table size to thereby cycle the index through the table. Either the CPU cores or the packet processing pipeline may access the load balancing table 2605 which is stored in memory 2604.

Figure 27:
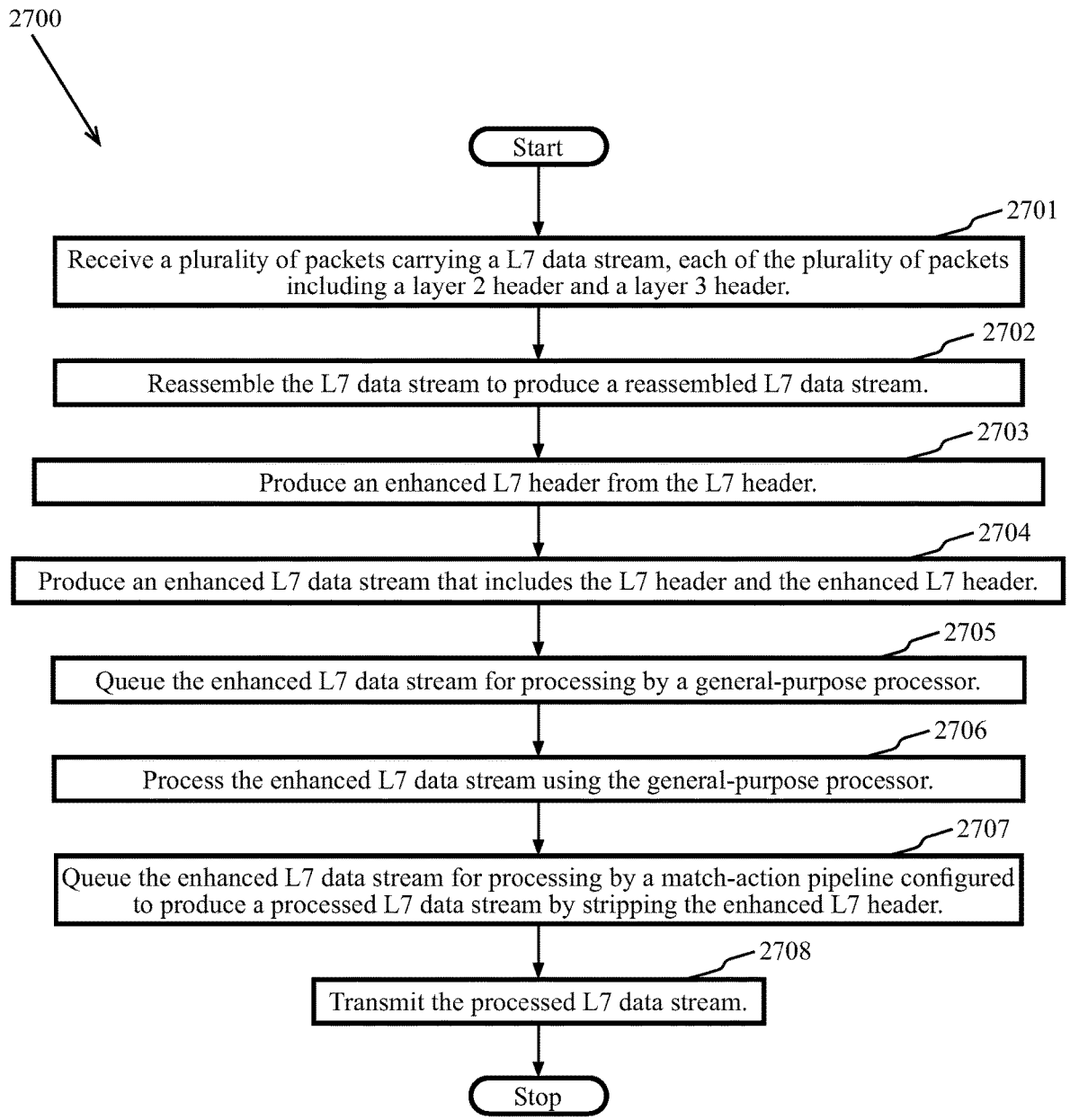
FIG. 27 illustrates a flowchart of a method for layer 7 hardware assist and CPU task offloads according to some aspects.

FIG. 27 illustrates a flowchart of a method for layer 7 hardware assist and CPU task offloads 2700 according to some aspects. At block 2701 the method can receive a plurality of packets carrying a L7 data stream, each of the plurality of packets including a layer 2 header and a layer 3 header. At block 2702, the method can reassemble the L7 data stream to produce a reassembled L7 data stream. At block 2703, the method can produce an enhanced L7 header from the L7 header. At block 2704, the method can produce an enhanced L7 data stream that includes the L7 header and the enhanced L7 header. At block 2705, the method can queue the enhanced L7 data stream for processing by a general-purpose processor. At block 2706, the method can process the enhanced L7 data stream using the general-purpose processor. At block 2707, the method can queue the enhanced L7 data stream for processing by a match-action pipeline configured to produce a processed L7 data stream by stripping the enhanced L7 header. At block 2708, the method can transmit the processed L7 data stream.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniBand interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
   receiving a plurality of packets carrying a Layer 7 (L7) data stream that includes a L7 header, each of the plurality of packets including a layer 2 header and a layer 3 header;
   reassembling the L7 data stream from the plurality of packets to produce a reassembled L7 data stream;
   producing an enhanced L7 header from the L7 header;
   producing an enhanced L7 data stream that includes the L7 header and the enhanced L7 header; and
   queueing the enhanced L7 data stream for processing by a general-purpose processor.

2. The method of claim 1,
   wherein the reassembled L7 data stream is indicated by a fragment list having fragment indicators indicating memory locations of L7 data stream fragments; and
   wherein the enhanced L7 data stream is indicated by an enhanced fragment list having enhanced fragment indicators indicating memory locations of enhanced L7 data stream fragments.

3. The method of claim 2, wherein the enhanced fragment indicators include L7 assist indicators indicating whether the enhanced L7 data stream fragments are enhanced L7 header fragments.

4. The method of claim 1,
   wherein the reassembled L7 data stream is indicated by a fragment list having fragment indicators indicating memory locations of L7 data stream fragments, and
   wherein the enhanced L7 data stream is produced by inserting an additional fragment indicator into the fragment list.

5. The method of claim 1 further comprising queueing the reassembled L7 data stream for processing by a L7 assist circuit, wherein the L7 assist circuit produces the enhanced L7 data stream.

6. The method of claim 1,
   wherein the L7 header includes Huffman coded elements, and
   wherein producing the enhanced L7 header includes using a L7 assist circuit to decode the Huffman coded elements.

7. The method of claim 1, wherein the enhanced L7 header includes a normalized header field produced by a L7 assist circuit from a header field in the L7 header.

8. The method of claim 1, wherein the enhanced L7 header includes a normalized uniform resource locator (URL) produced by a L7 assist circuit from a URL in the L7 header.

9. The method of claim 1 wherein the enhanced L7 header includes a hash computed from a normalized uniform resource locator (URL) produced by a L7 assist circuit from a URL in the L7 header.

10. The method of claim 1 further comprising:
    producing an outbound enhanced L7 data stream by processing the enhanced L7 data stream using the general-purpose processor, the outbound enhanced L7 data stream having an outbound enhanced L7 header;
    producing an outbound L7 data stream by processing the outbound enhanced L7 data stream using an L7 assist circuit that removes the outbound enhanced L7 header;
    producing a plurality of outbound packets carrying the outbound L7 data stream; and
    transmitting the plurality of outbound packets.

11. A network appliance comprising:
    a control plane including a general-purpose processor; and
    a data plane configured to:
      receive a plurality of packets carrying a Layer 7 (L7) data stream that includes a L7 header, each of the plurality of packets including a layer 2 header and a layer 3 header,
      reassemble the L7 data stream to produce a reassembled L7 data stream,
      produce an enhanced L7 header from the L7 header,
      produce an enhanced L7 data stream that includes the L7 header and the enhanced L7 header, and
      queue the enhanced L7 data stream for processing by the general-purpose processor
    wherein
      the L7 header includes at least one of a destination uniform resource locator (URL) and Huffman coded data, and
      the enhanced L7 data stream includes at least one of a normalized URL, a URL hash and unencoded data that is Huffman decoded.

12. The network appliance of claim 11,
    wherein the reassembled L7 data stream is indicated by a fragment list having fragment indicators indicating memory locations of L7 data stream fragments; and
    wherein a L7 assist circuit in the data plane is configured to produce an enhanced fragment list having enhanced fragment indicators indicating memory locations of enhanced L7 data stream fragments, the enhanced fragment list indicating the enhanced L7 data stream.

13. The network appliance of claim 12, wherein the enhanced fragment indicators include L7 assist indicators indicating whether the enhanced L7 data stream fragments are enhanced L7 header fragments.

14. The network appliance of claim 11,
    wherein the L7 header includes Huffman coded elements, and
    wherein producing the enhanced L7 header includes using a L7 assist circuit to decode the Huffman coded elements.

15. The network appliance of claim 11, wherein the enhanced L7 header includes a normalized header field produced by a L7 assist circuit from a header field in the L7 header.

16. The network appliance of claim 11, wherein the enhanced L7 header includes a normalized uniform resource locator (URL) produced by a L7 assist circuit from a URL in the L7 header.

17. The network appliance of claim 11, wherein the enhanced L7 header includes a hash computed from a normalized uniform resource locator (URL) produced by a L7 assist circuit from a URL in the L7 header.

18. The network appliance of claim 11 wherein:
an L7 assist circuit in the data plane is configured to
  produce the enhanced L7 data stream,
  receive an outgoing enhanced L7 data stream that includes an outbound enhanced L7 header, and
  produce an outbound L7 data stream by processing the outbound enhanced L7 data stream by removing the outbound enhanced L7 header;
a packet processing pipeline circuit in the data plane is configured to produce a plurality of outbound packets carrying the outbound L7 data stream; and
the general-purpose processor is configured to produce the outgoing enhanced L7 data stream from the enhanced L7 data stream, and the data plane is configured to transmit the plurality of outbound packets.

19. A system comprising:
a means for receiving a plurality of packets carrying a Layer 7 (L7) data stream that includes a L7 header, each of the plurality of packets including a layer 2 header and a layer 3 header;
a means for reassembling the L7 data stream from the plurality of packets to produce a reassembled L7 data stream;
a means for producing an enhanced L7 header from the L7 header;
a means for producing an enhanced L7 data stream that includes the L7 header and the enhanced L7 header; and
a means for queueing the enhanced L7 data stream for processing by a general-purpose processor.

20. The system of claim 19 further comprising
a hardware implemented processing means configured to decode Huffman coded elements, to produce a hash of a normalized uniform resource locator (URL),
wherein
  the L7 data stream includes a Huffman coded L7 header element, and
  the enhanced L7 data stream includes the hash of the normalized URL.

\* \* \* \* \*